US007832579B2

(12) United States Patent
Lohrman et al.

(10) Patent No.: US 7,832,579 B2
(45) Date of Patent: Nov. 16, 2010

(54) MANUFACTURE OF REMOVABLE MANUFACTURE SEALING COMPONENTS FOR CONSUMER PACKAGING

(75) Inventors: Richard Lohrman, North Aurora, IL (US); Tom Hennessy, Naperville, IL (US); Sungsuk Steve Kim, Batavia, IL (US); Gary Smith, Geneva, IL (US); Brian Adams, Newark, CA (US)

(73) Assignee: Portola Packaging, Inc., Batavia, IL (US)

( * ) Notice: Subject to any disclaimer, the term of this patent is extended or adjusted under 35 U.S.C. 154(b) by 177 days.

(21) Appl. No.: 11/929,160

(22) Filed: Oct. 30, 2007

(65) Prior Publication Data

US 2008/0179276 A1 Jul. 31, 2008

Related U.S. Application Data

(63) Continuation of application No. 11/610,217, filed on Dec. 13, 2006, which is a continuation-in-part of application No. 10/854,925, filed on May 26, 2004.

(60) Provisional application No. 60/473,847, filed on May 27, 2003.

(51) Int. Cl.
*B65D 41/32* (2006.01)
(52) U.S. Cl. .................. 215/256; 215/253; 215/235; 220/258.2; 220/258.3
(58) Field of Classification Search ............ 215/346, 215/253, 355, 235, 255, 256, 254; 220/258.2, 220/258.3
See application file for complete search history.

(56) References Cited

U.S. PATENT DOCUMENTS

| 3,160,327 | A | * | 12/1964 | Porcelli | 222/153.07 |
|---|---|---|---|---|---|
| 3,282,477 | A | * | 11/1966 | Henchert | 222/541.9 |
| RE29,850 | E | * | 11/1978 | Labarre | 222/541.9 |
| 4,171,749 | A | * | 10/1979 | Obrist et al. | 215/256 |
| 4,533,062 | A | * | 8/1985 | Krautkramer | 220/258.2 |
| 4,682,702 | A | * | 7/1987 | Gach | 222/541.9 |
| 5,301,849 | A | * | 4/1994 | Guglielmini et al. | 222/517 |
| 5,735,426 | A | * | 4/1998 | Babcock et al. | 220/258.2 |
| 5,755,360 | A | * | 5/1998 | Elliott | 222/153.07 |
| 5,785,209 | A | * | 7/1998 | Guglielmini | 222/153.07 |
| 5,810,207 | A | * | 9/1998 | Hayashida | 222/153.07 |
| 5,875,942 | A | * | 3/1999 | Ohmi et al. | 222/556 |
| 5,915,574 | A | * | 6/1999 | Adams et al. | 215/45 |
| 6,016,931 | A | * | 1/2000 | Ohmi et al. | 215/256 |
| 6,116,445 | A | * | 9/2000 | Ikemori et al. | 215/301 |

(Continued)

*Primary Examiner*—Anthony Stashick
*Assistant Examiner*—Christopher B McKinley
(74) *Attorney, Agent, or Firm*—James P. Hanrath; Adam K. Sacharoff

(57) ABSTRACT

A closure for a container having a container opening is provided herein. The closure includes an annular top having an inner skirt depending downwardly from an inner perimeter of the annular top and having an outer skirt depending downwardly from an outer perimeter of the annular top. An annular bottom extends radially inward from the inner skirt, and the annular bottom has defined thereon a dispensing aperture positioned adjacent to the container opening when the closure is mounted to the container. A sealing member is formed to the annular bottom for closing the dispensing aperture. The outer skirt optionally includes a hingedly flexible flap having one or more gussets dimensioned to cooperate with the anti-rotation structure of a neck finish.

4 Claims, 30 Drawing Sheets

U.S. PATENT DOCUMENTS

| | | | |
|---|---|---|---|
| 6,247,605 B1 * | 6/2001 | Fujie et al. | 215/256 |
| 6,574,848 B2 * | 6/2003 | Fujie et al. | 29/281.5 |
| 6,776,314 B2 * | 8/2004 | Odet | 222/541.5 |
| 6,793,101 B2 * | 9/2004 | Shinozaki et al. | 222/153.02 |
| 7,308,988 B2 * | 12/2007 | Yashima et al. | 215/344 |
| 2001/0011649 A1 * | 8/2001 | Fujie et al. | 215/256 |
| 2001/0015355 A1 * | 8/2001 | Adams et al. | 220/258 |
| 2004/0065665 A1 * | 4/2004 | Mahdi et al. | 220/258.2 |

* cited by examiner

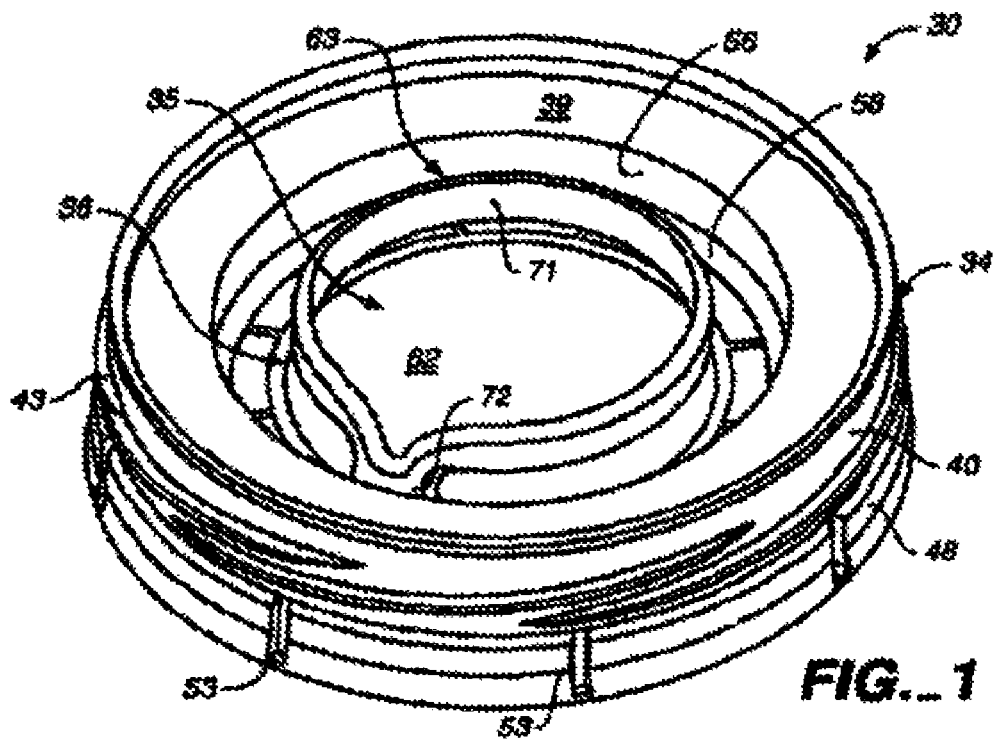
FIG._1
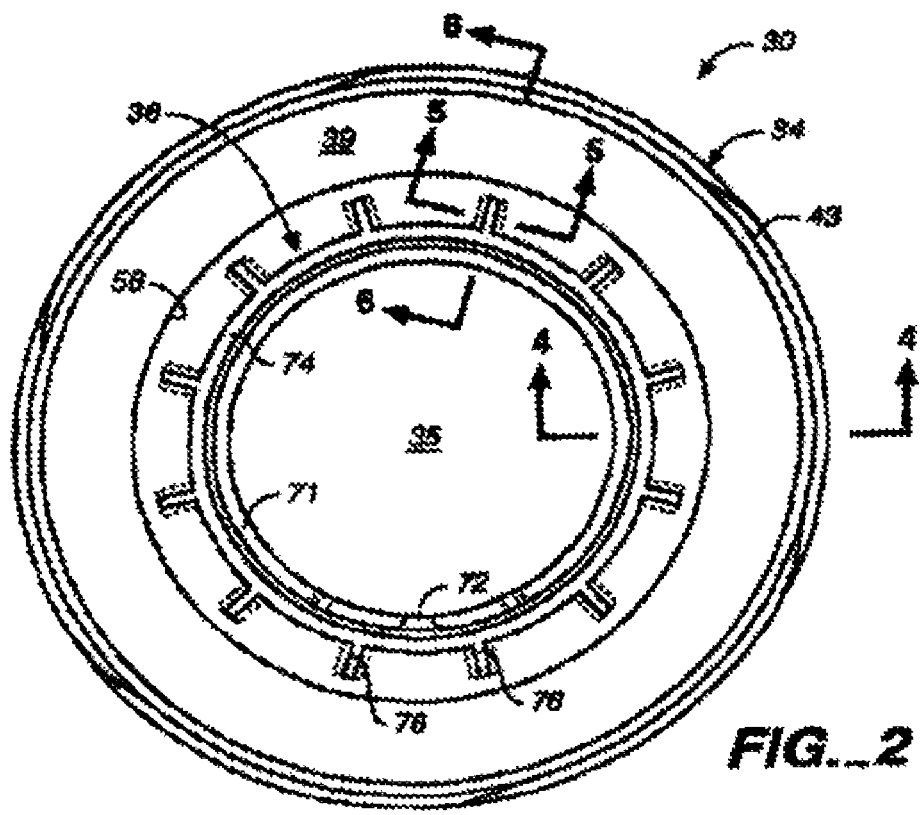
FIG._2

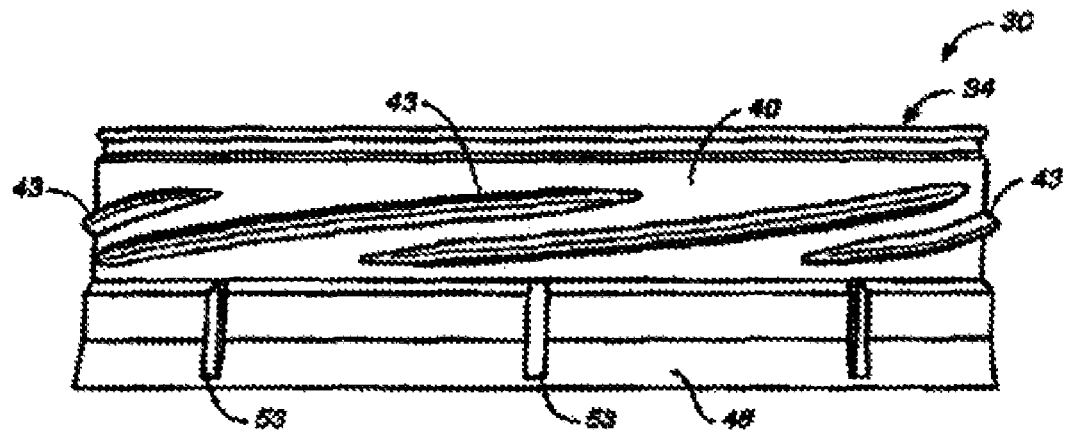
FIG._3
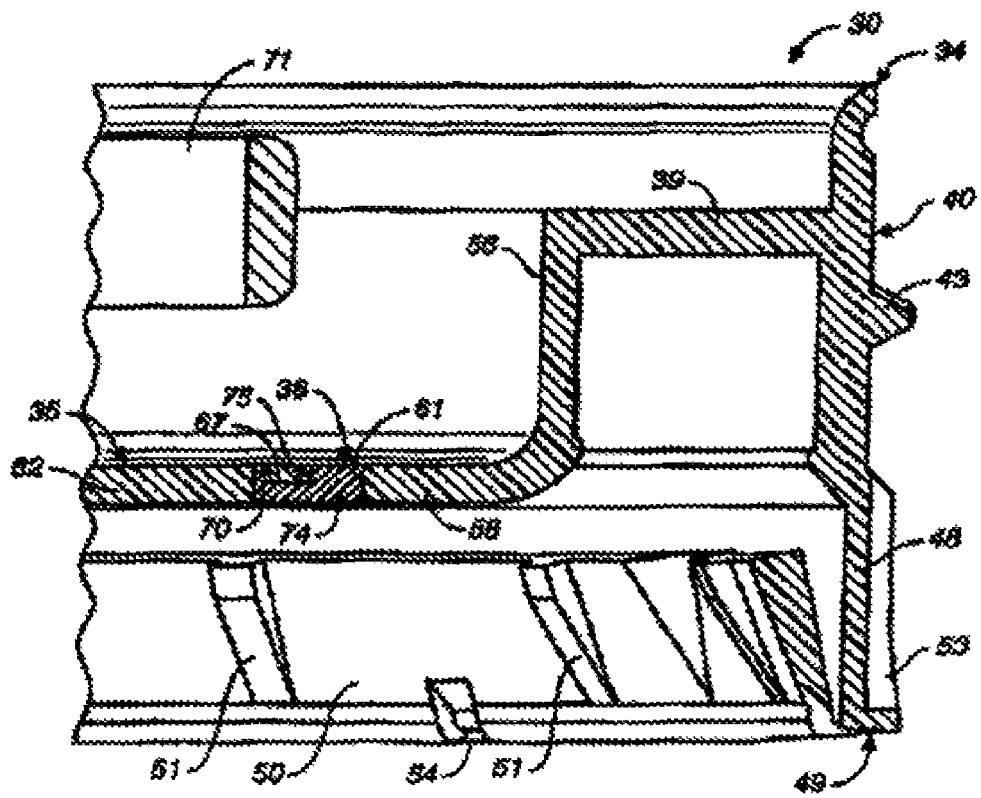
FIG._4

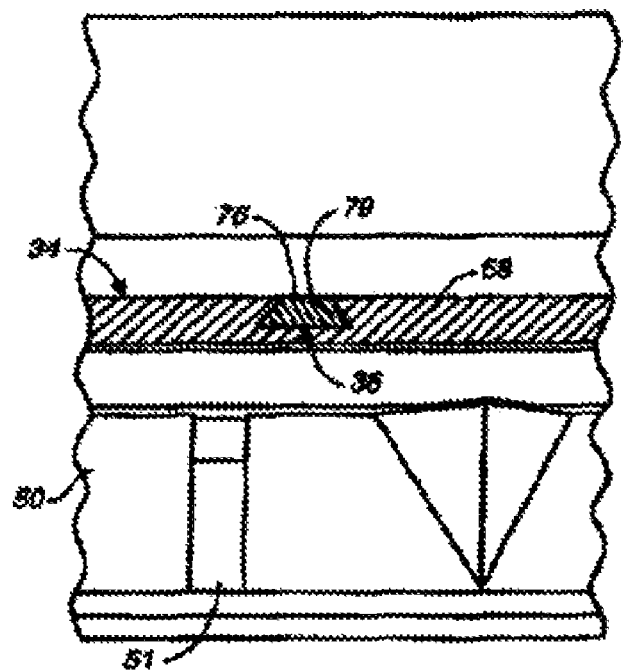
FIG._5
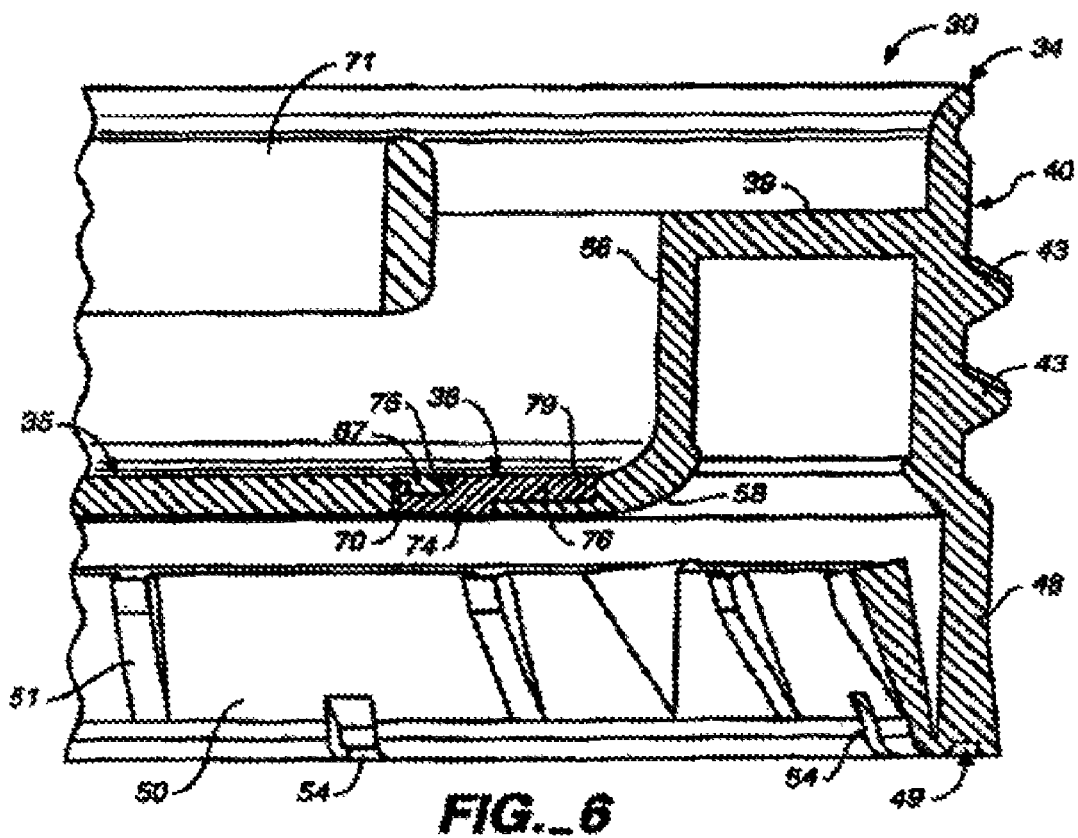
FIG._6

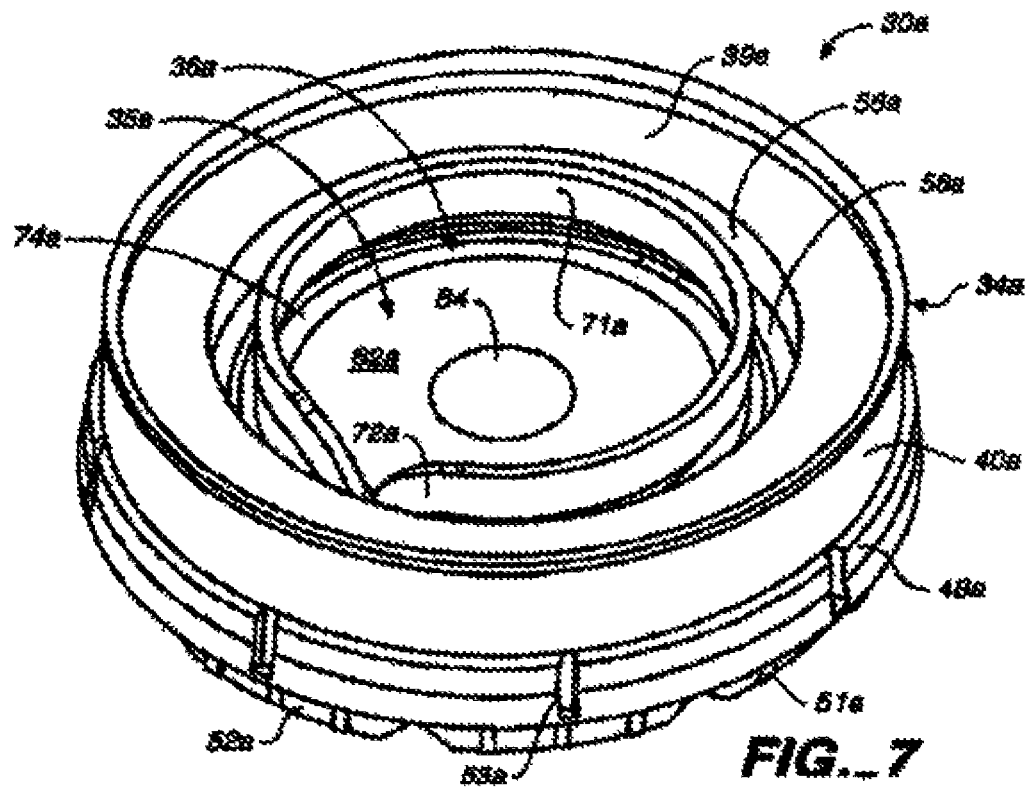
FIG._7
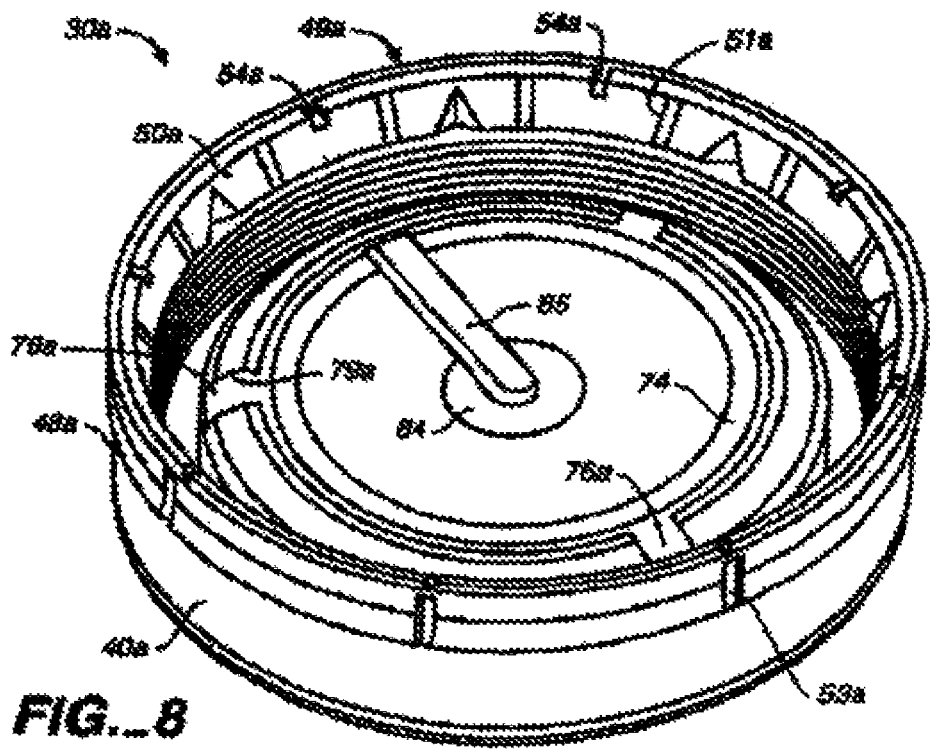
FIG._8

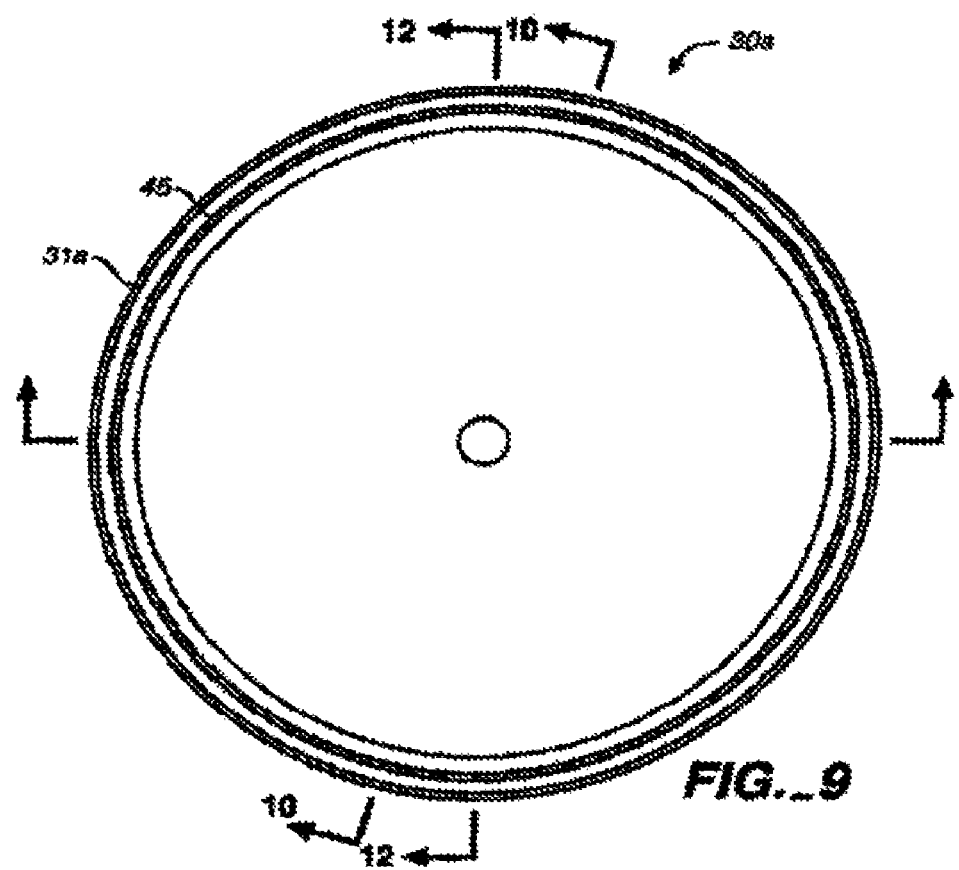
FIG._9
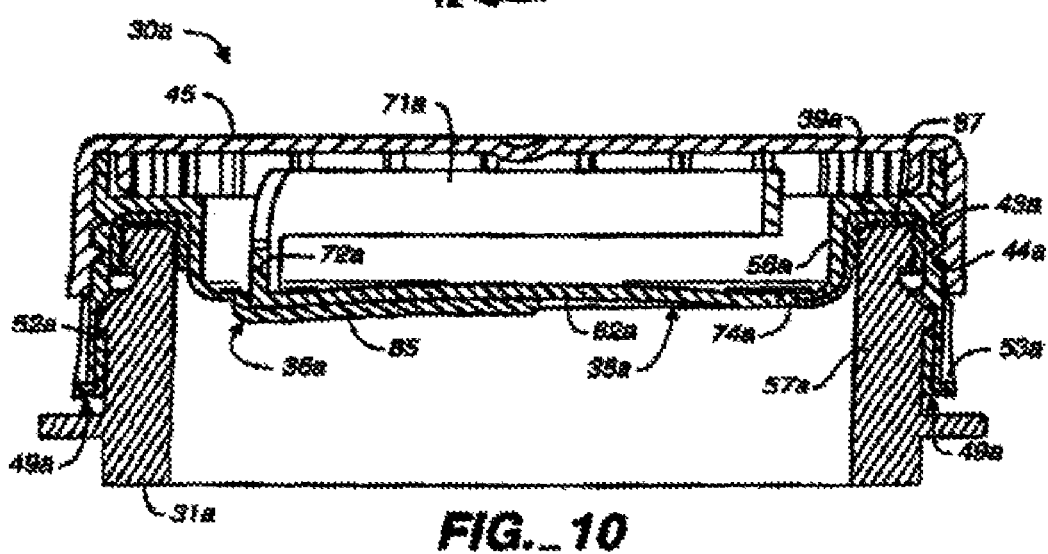
FIG._10

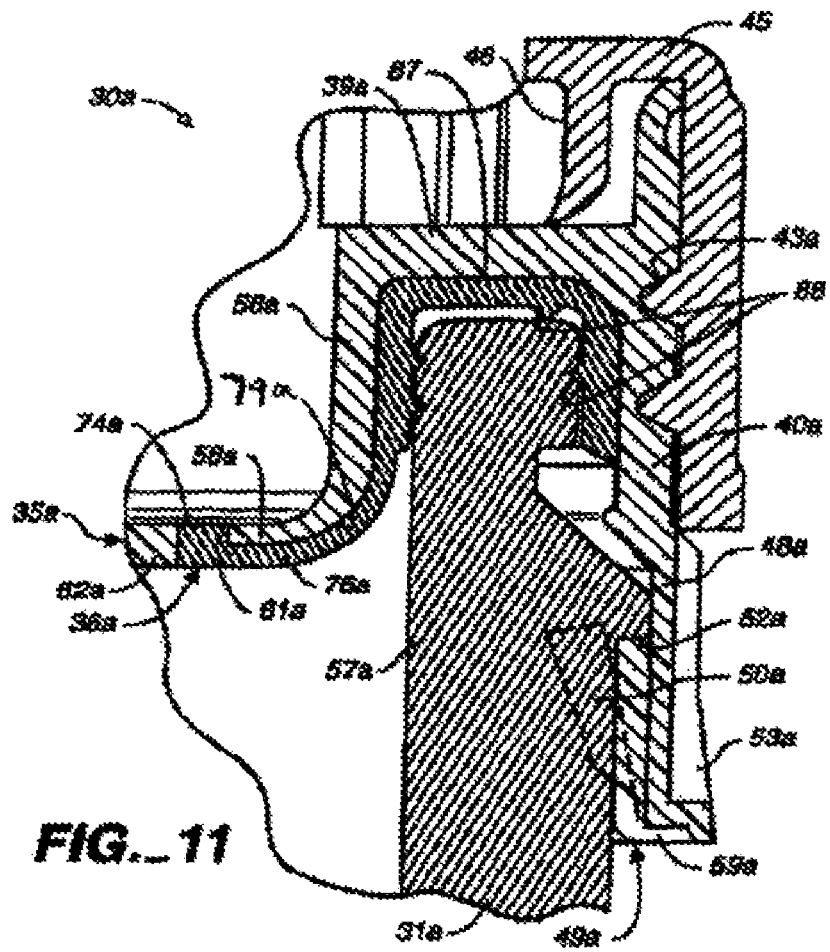
FIG._11
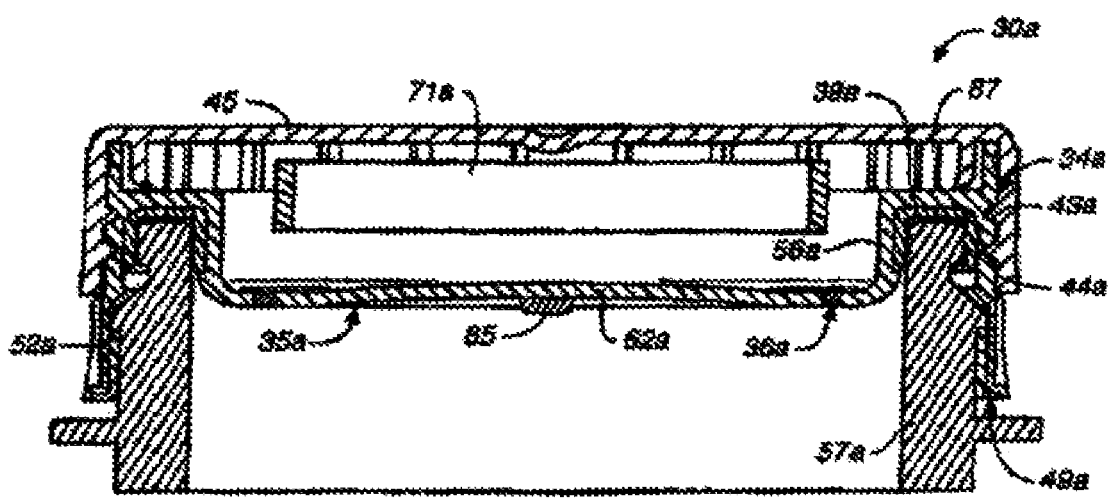
FIG._12

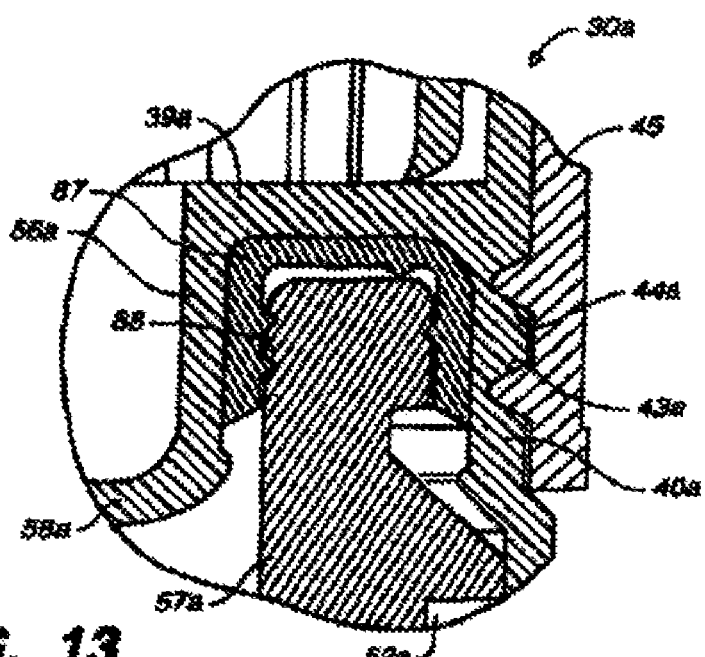
FIG._13
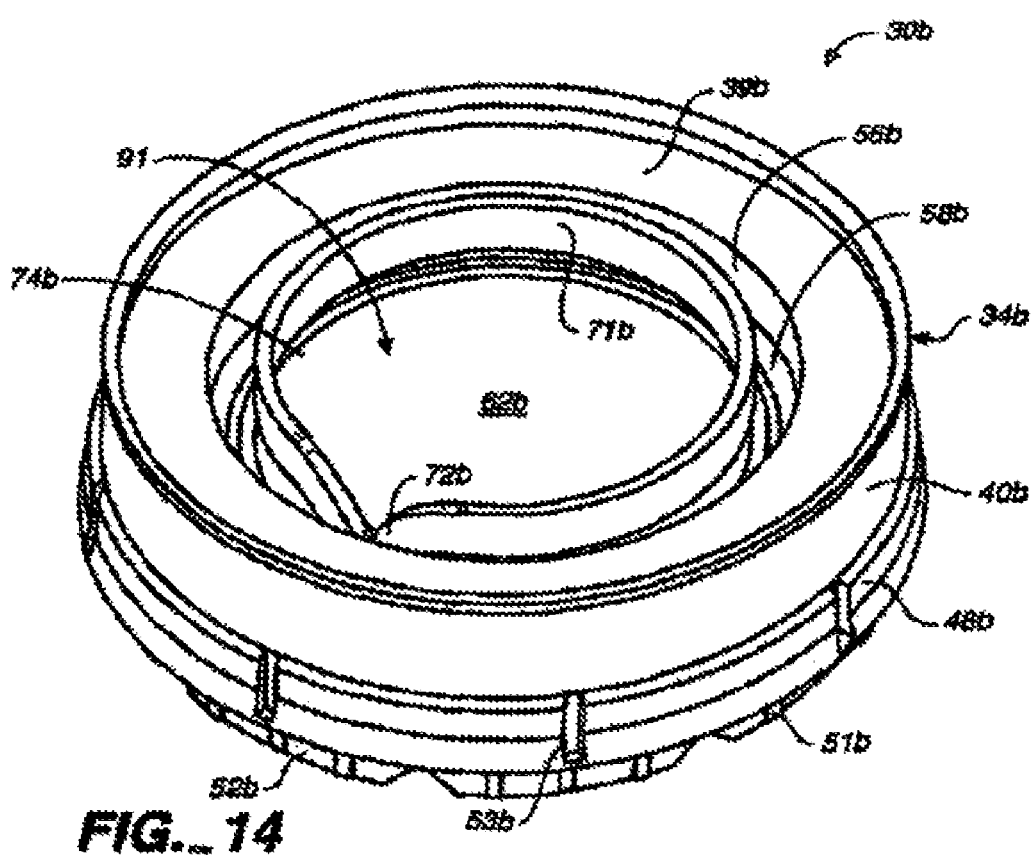
FIG._14

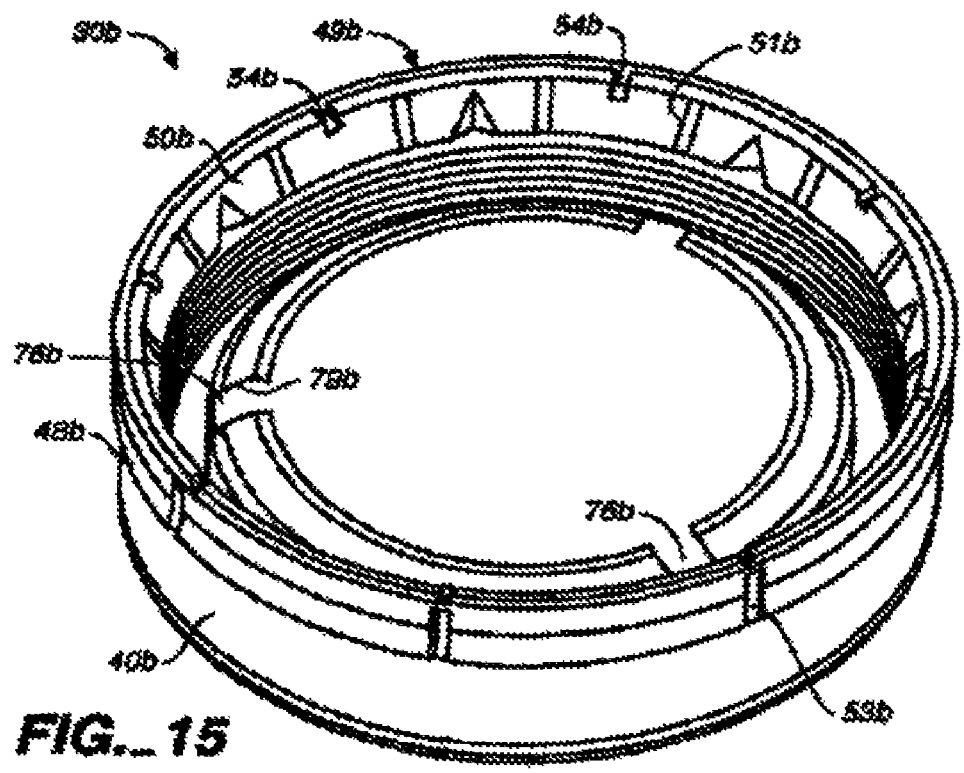
FIG._15
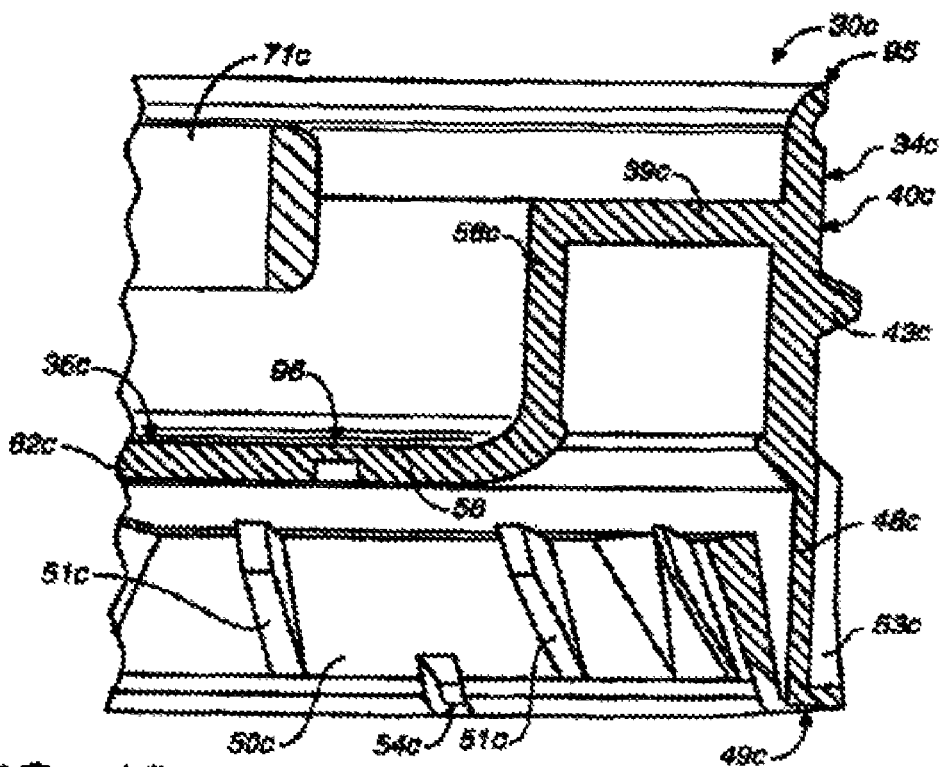
FIG._16

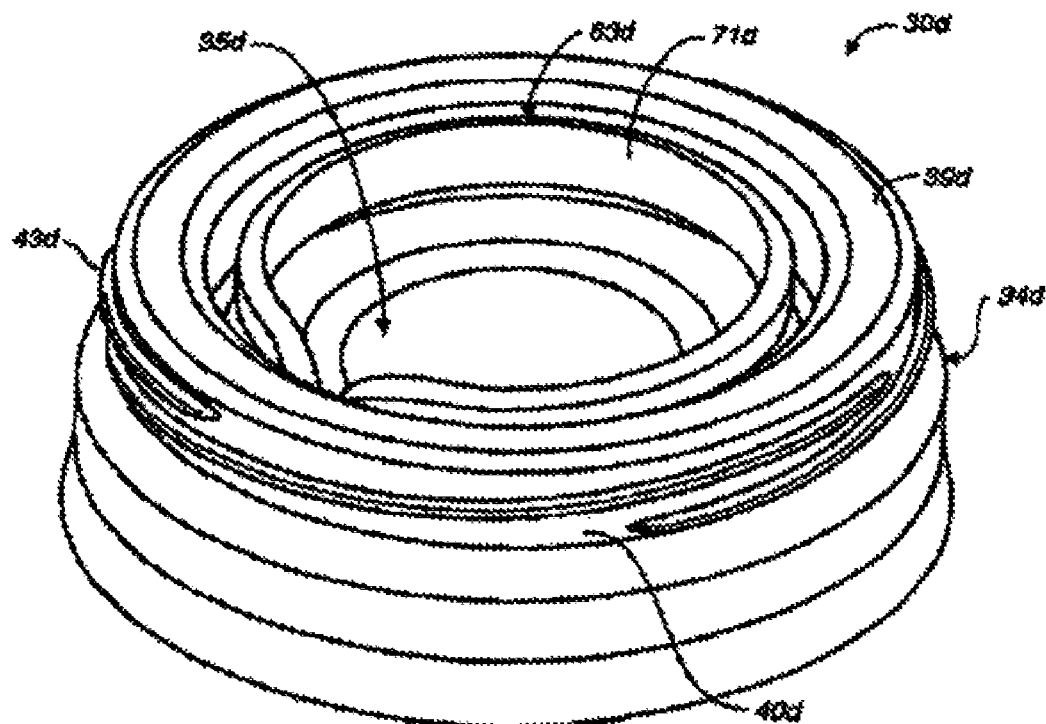
FIG._17
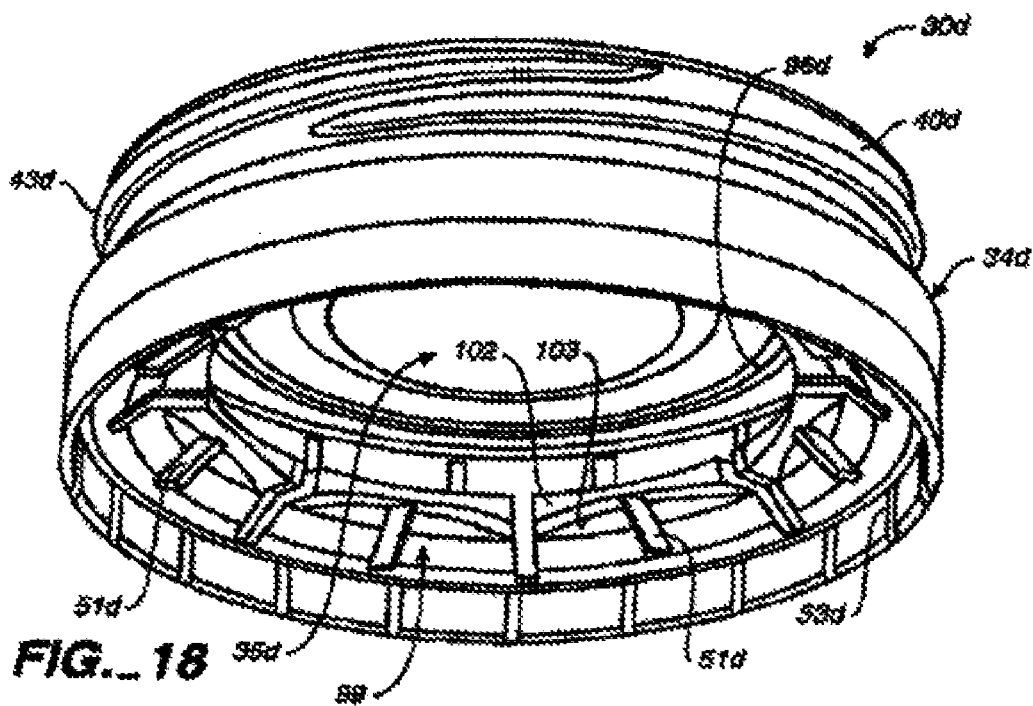
FIG._18

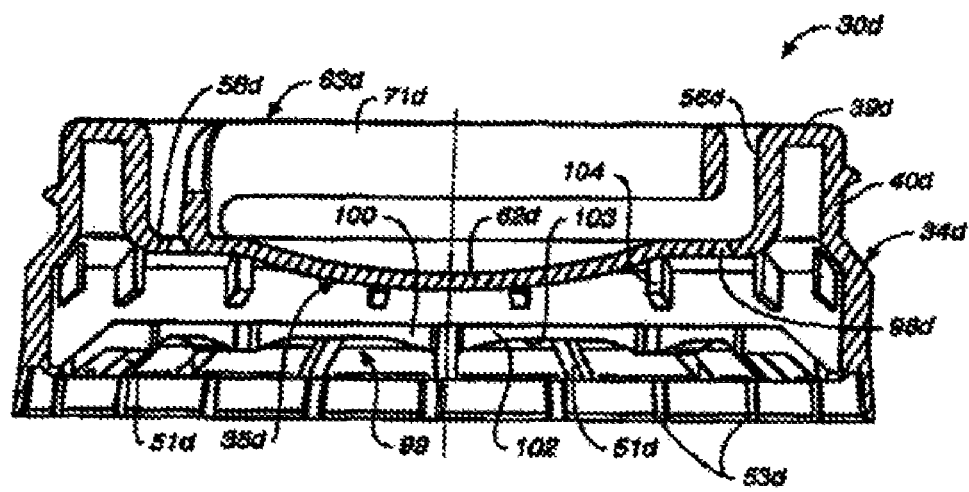
FIG._19
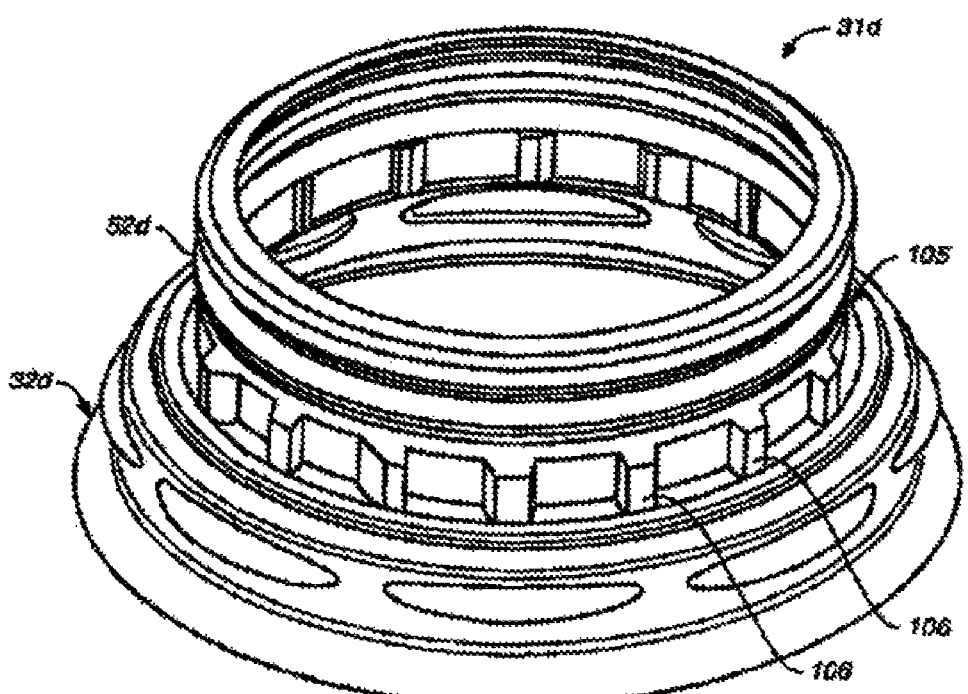
FIG._20

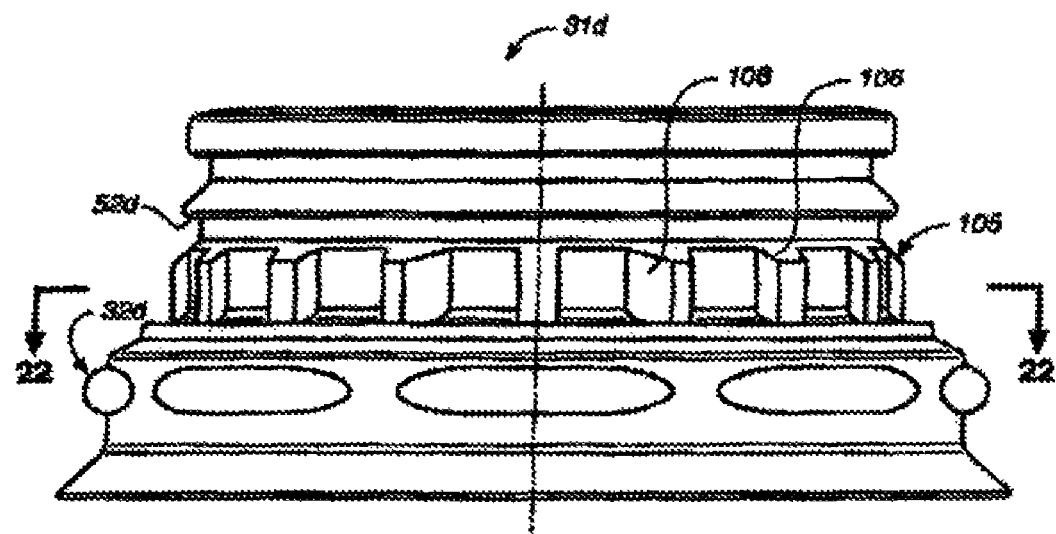
FIG._21
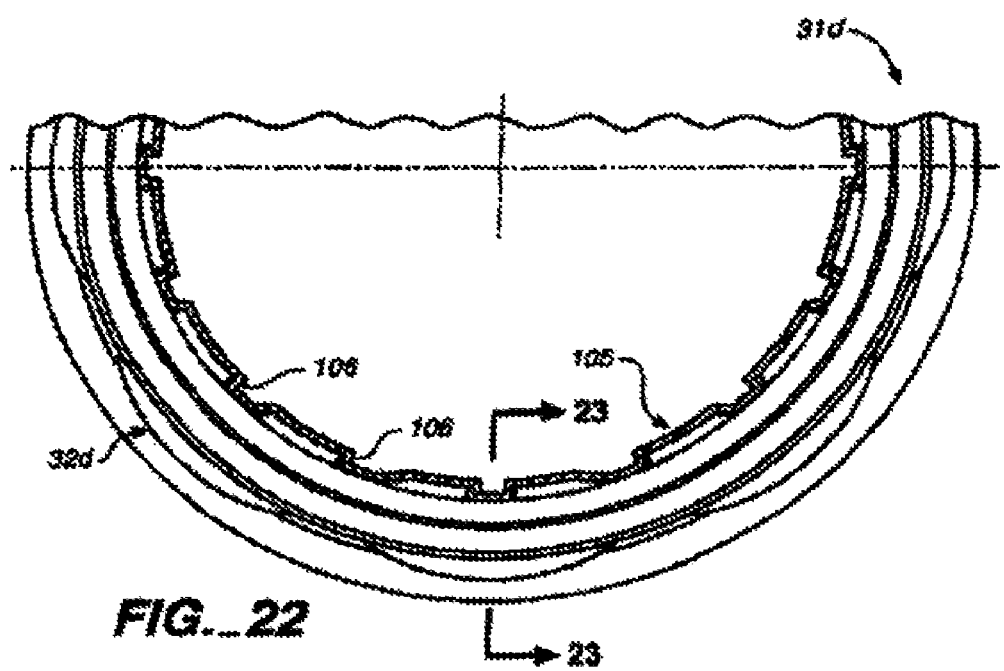
FIG._22

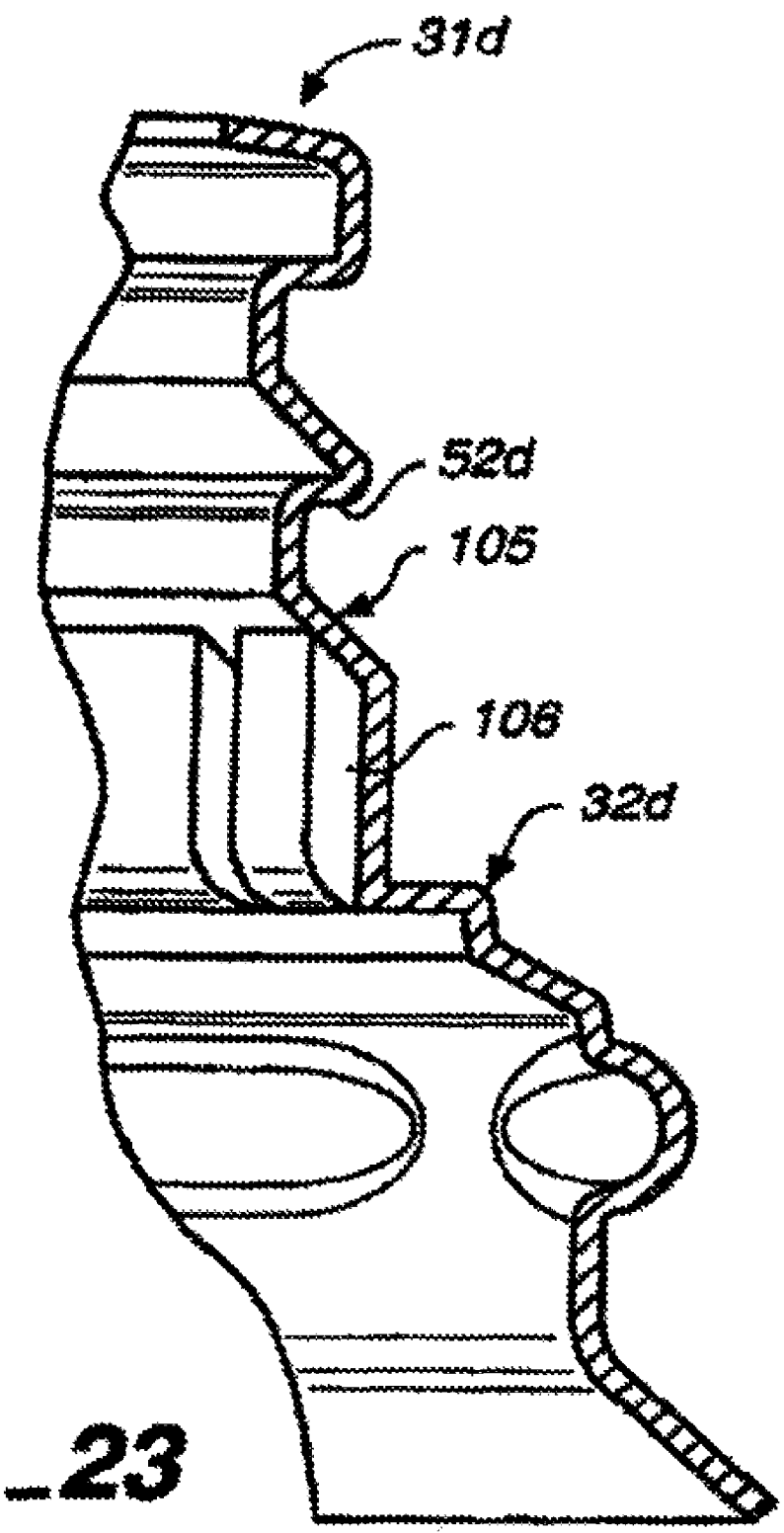
FIG._23

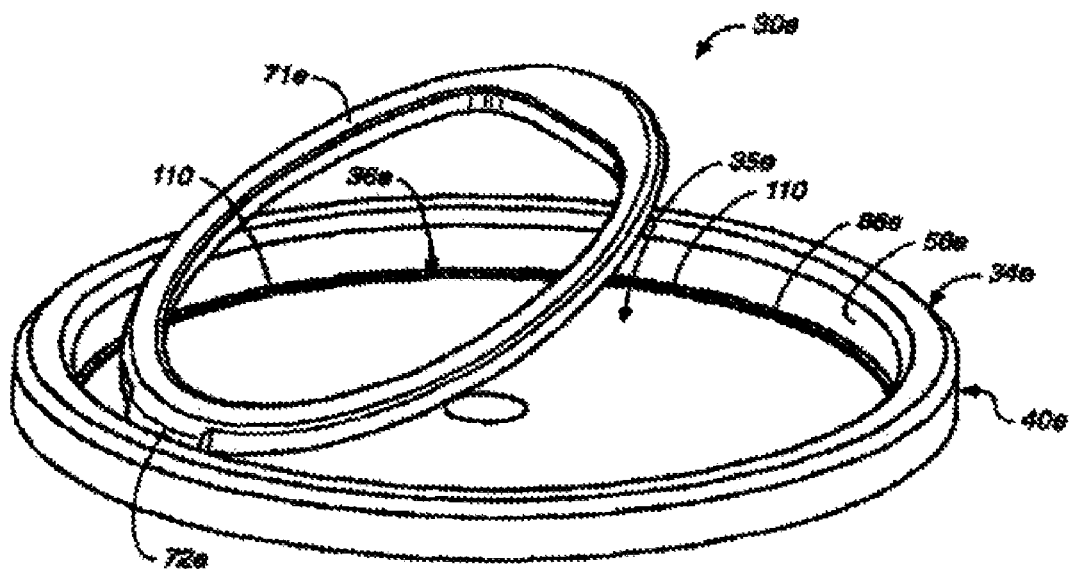
FIG._26
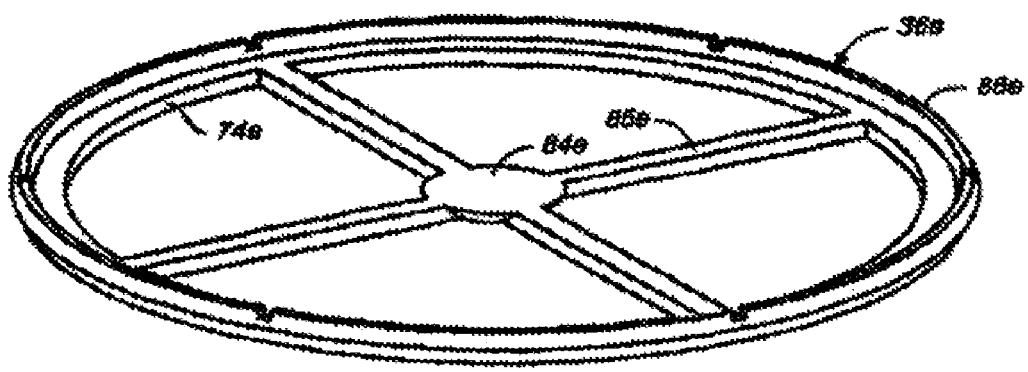
FIG._27

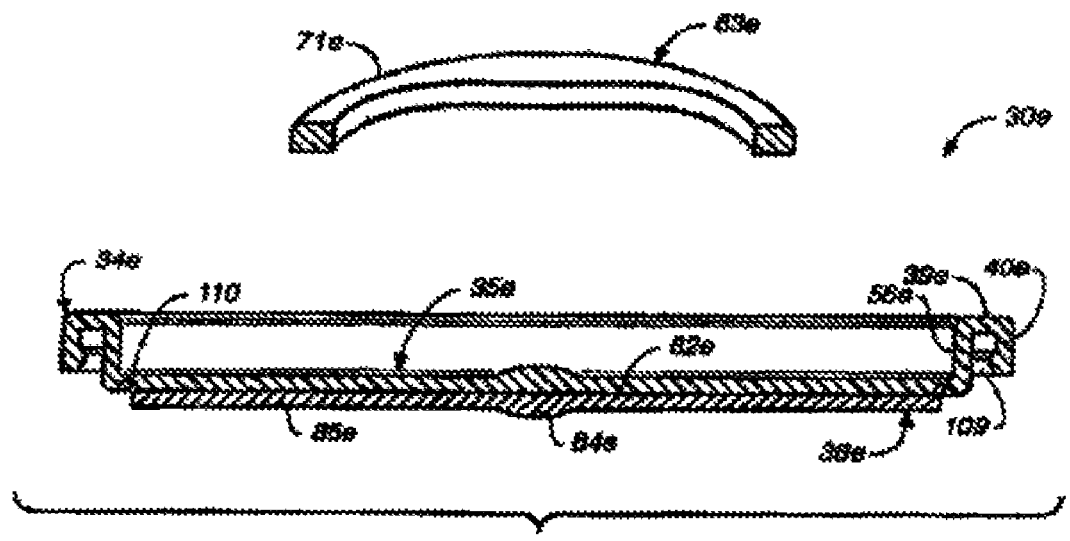
FIG._29
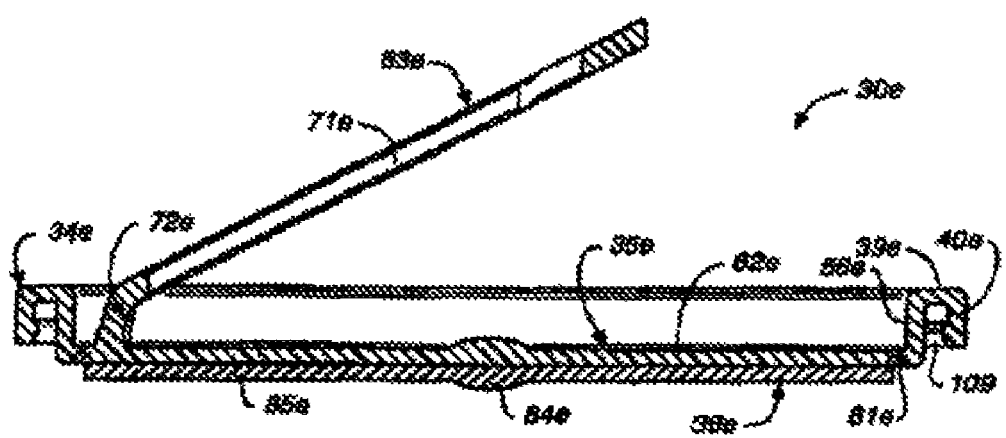
FIG._30

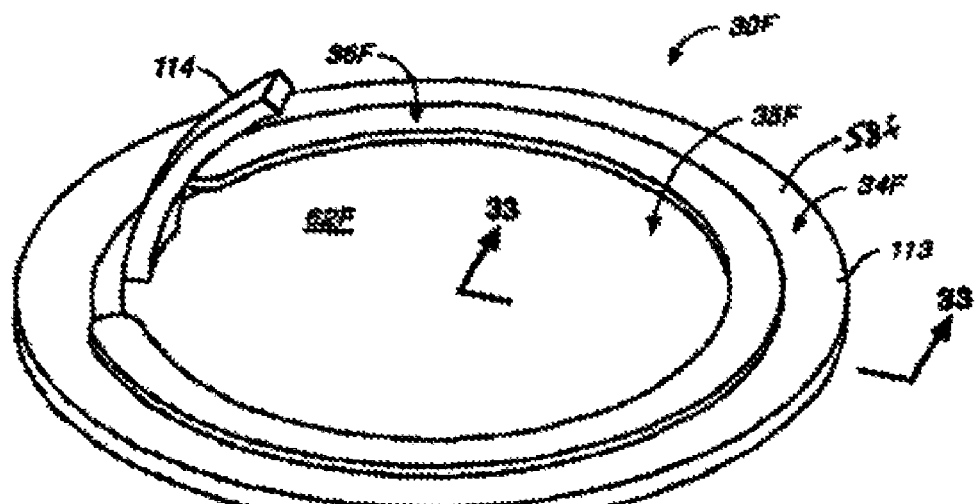
FIG._31
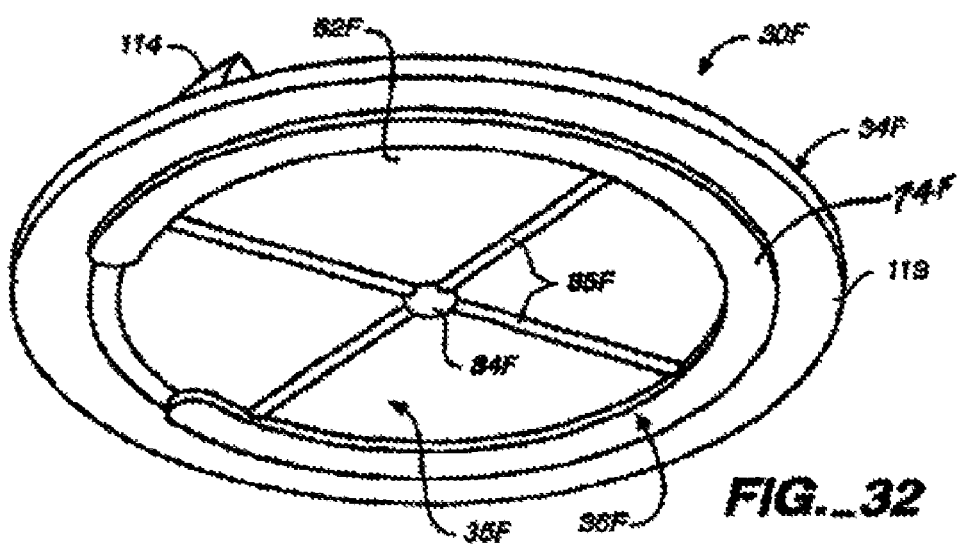
FIG._32
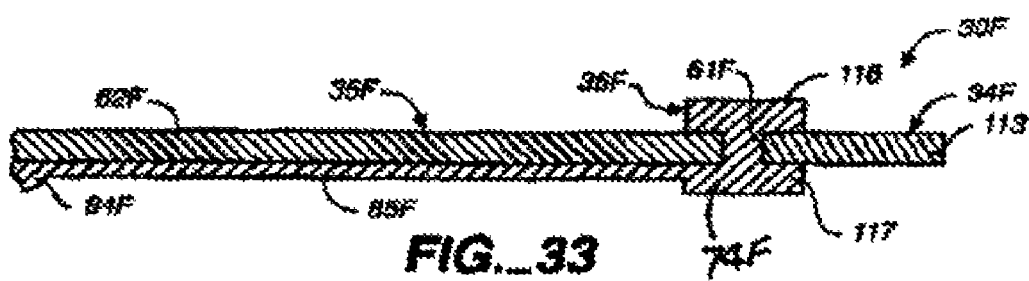
FIG._33

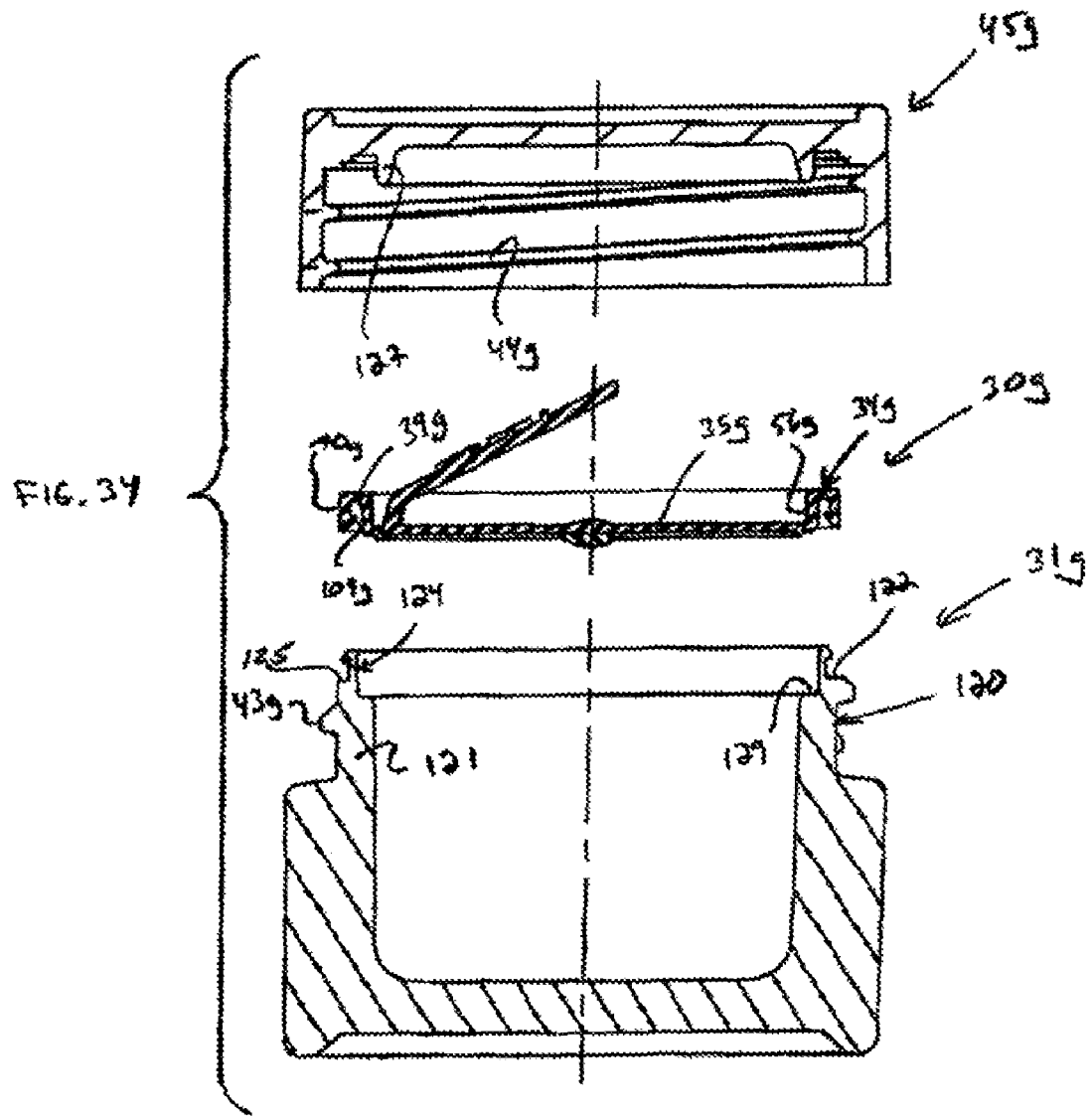

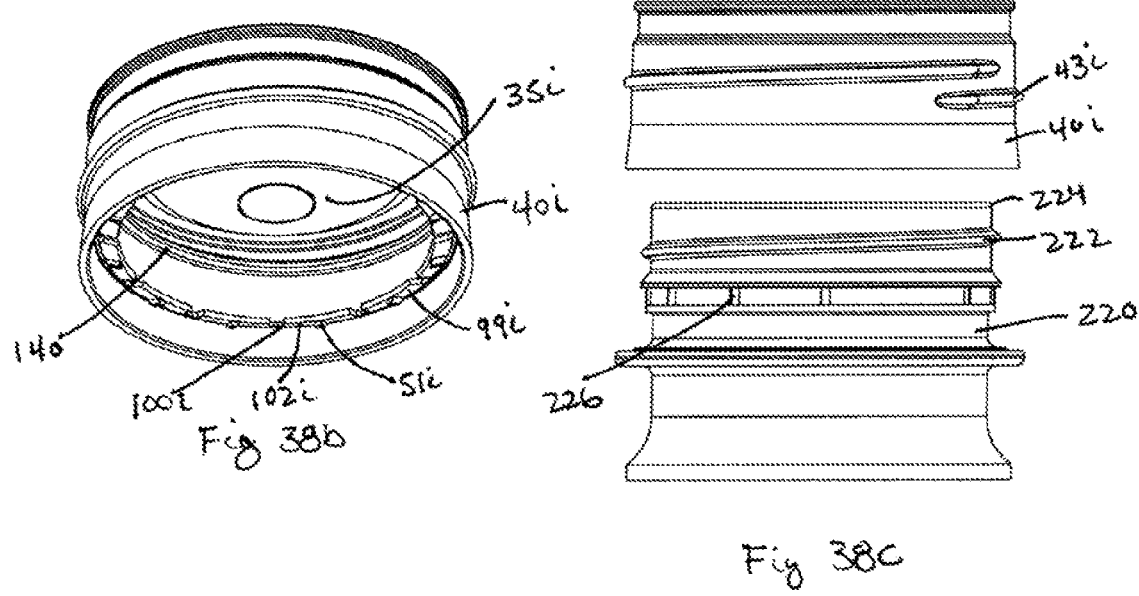

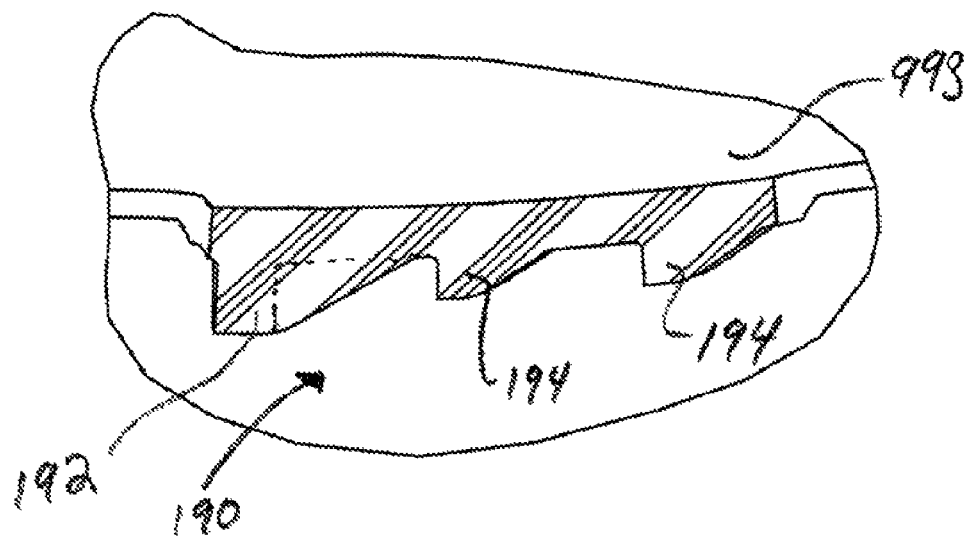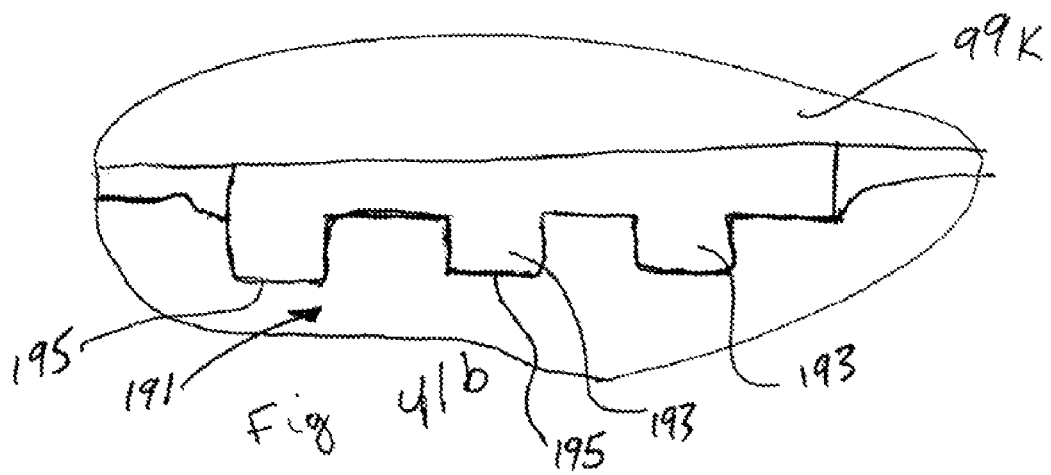
FIG. 41r

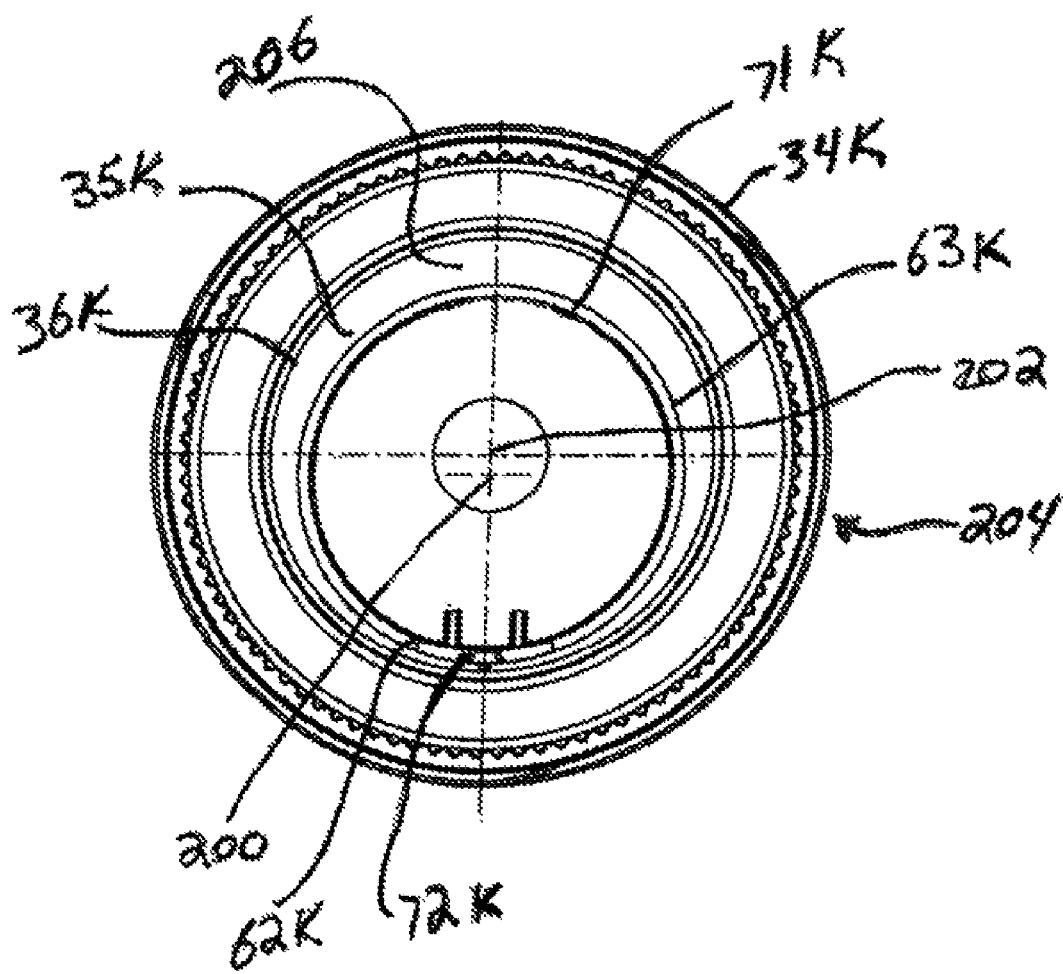

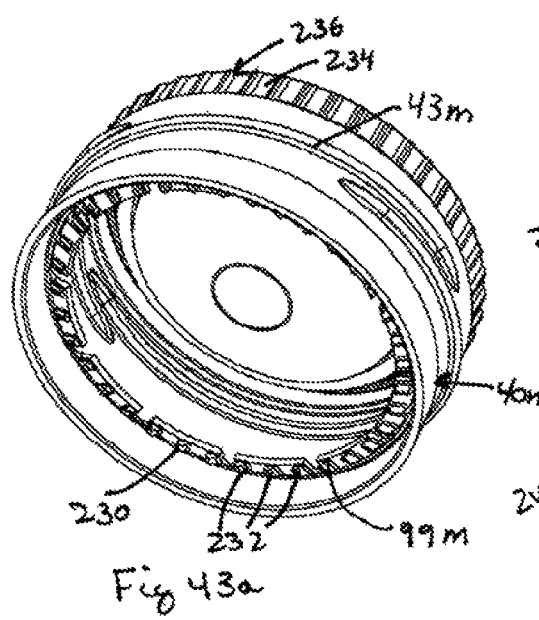
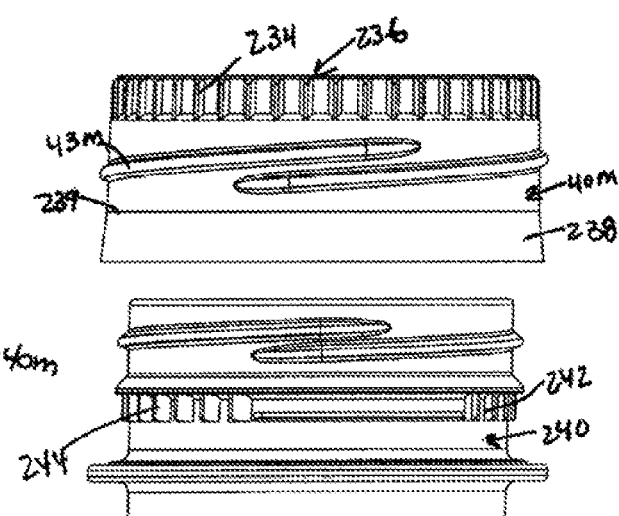
Fig 43a
Fig 43b

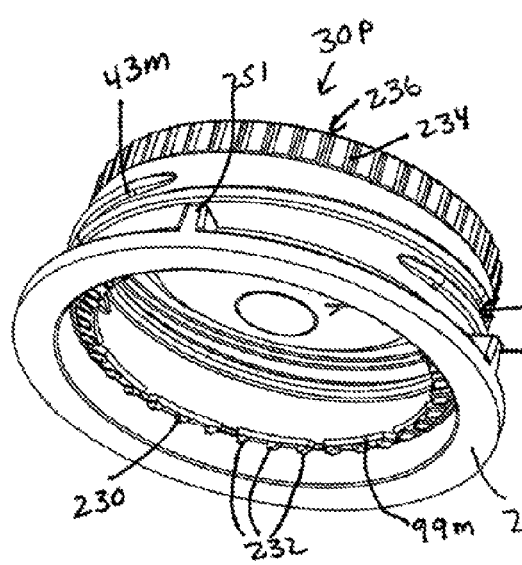
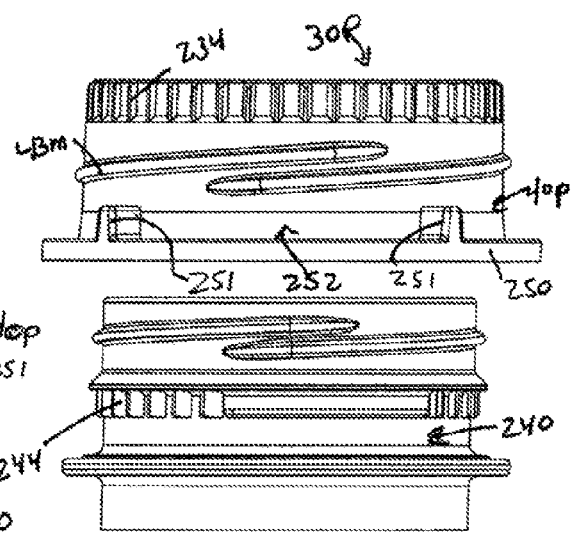
Fig 45a
Fig 45b

MANUFACTURE OF REMOVABLE MANUFACTURE SEALING COMPONENTS FOR CONSUMER PACKAGING

CROSS-REFERENCES TO RELATED APPLICATIONS

This application is a continuation of U.S. patent application Ser. No. 11/610,217 filed Dec. 13, 2006, entitled DESIGN AND MANUFACTURE OF REMOVABLE MEMBRANE SEALING COMPONENTS FOR CONSUMER PACKAGING, which is a continuation-in-part of U.S. patent application Ser. No. 10/854,925 filed May 26, 2004, entitled METHOD OF JOINING SEPARABLE COMPONENTS AND CONTAINER CLOSURE SYSTEM FORMED BY THE SAME, which claims priority to U.S. Provisional Patent Application No. 60/473,847 filed May 27, 2003, entitled METHOD OF JOINING SEPARABLE COMPONENTS AND CONTAINER CLOSURE SYSTEM FORMED BY THE SAME, the entire contents of which is incorporated herein by this reference.

BACKGROUND OF THE INVENTION

1. Field of the Invention

This invention relates, in general, to a method for design and manufacture of closures and dispensing components for packaging of consumer goods and in particular packaging components incorporating removable membranes to form a primary seal.

2. Description of Related Art

Tamper-evidencing closure systems are known and often include a closure having a removable tamper-evidencing portion that is monolithically formed with the remainder of the closure. Upon initial opening of such known closures the tamper-evidencing portion fractures and/or tears away from the remainder of the closure.

One known type of closure system utilizes a cap having a skirt and a tamper-evident band dependent from and monolithically joined to a base of the skirt. The band is engaged with complimentary structure on a corresponding container and is severed from the cap skirt when the closure is initially removed. The severing is allowed by making the interconnection between the tamper-evident band and the cap skirt frangible and easily broken. Typically, discrete breakable "bridges" or a continuous thin "score line" is utilized to form the frangible connection.

One exemplar of the prior art is U.S. Pat. No. 5,480,045 to Molinaro et al. which discloses a cap including a frangible tear skirt interconnected with a depending wall by frangible connection members. Another exemplar of the prior art is U.S. Pat. No. 5,284,265 to Crisci which discloses a cap having a frangible tear skirt interconnected with a cap top along a score line or tear line.

Another known closure system involves monolithically molded pull-out membranes, as commonly employed on gable-top juice containers and some vegetable oil containers. This system incorporates a removable membrane initially closing a dispensing orifice of the container. The membrane is monolithically formed with additional structure appropriate for attachment to the container such as a weld flange or a snap attachment skirt. The membrane is integrally connected to the attachment structure through a frangible line of weakness. Initial opening by a consumer is done by gripping and pulling a finger tab that is joined to the membrane whereby removing the membrane fractures the closure and tears the membrane away from the additional structure along the frangible line of weakness.

An exemplar of the prior art is U.S. Pat. No. 5,810,184 to Adams et al. which discloses a fitment having a removable membrane interconnected with a spout along a line of weakness or tear line.

While prior closure systems function quite successfully, current systems using frangible separation of integrally molded components have several disadvantages. In the case of dependent breakaway tamper-evidencing bands, the demands of application and retention of the tamper-evidencing band often conflict with the requirements of the primary closure portion. For example, when discrete bridges are employed, the mechanical characteristics required for bridge integrity during application often conflict with the mechanical characteristics appropriate for easy removal by a consumer upon opening the closure system. In the case of continuous frangible score lines or tear lines, material selection is normally restricted to forms of low density polyethylene, since this is the only commodity material exhibiting facile tear performance.

Similarly, pull-out membrane closure systems generally include a membrane, a frangible score line, and an attachment structure which are monolithically molded in a single integral shot during an injection molding operation. Such configuration significantly restricts possible material choices for forming the system. The frangible score line must easily and readily tear without excessive force. As noted above, the most applicable material in this regard is low density polyethylene. However, specifying that the frangible line be made of low density polyethylene further specifies that the membrane itself, and more importantly the attachment structure, be formed of the same low density polyethylene material. Disadvantageously, this can negatively impact potential applications, since the mechanical properties of low density polyethylene may not be appropriate to accomplish the performance required for package integrity.

A further problem intrinsic with pull out membrane technology is that substantial material flow is required across a thin frangible score line which connects the pull out membrane to the container attachment structure. This configuration may lead to unusual and unpredictable performance including, but not limited to, microscopic pin holes, lamination and difficult tearing resulting from physical properties of the material which may change as the material traverses the thin frangible score line.

A continuing demand for improved shelf life for perishable products is commonly addressed by packaging these products under aseptic conditions. This technique involves first disinfecting both the product and the packaging components intended to contain the product to eliminate any trace of microorganisms and bacteria that would contribute to accelerated product deterioration at normal room temperatures. Once accomplished, the product is packaged and sealed while maintaining sterile conditions in a sterile or clean room environment. The contained product/package only leaves the sterile environment after the package has been completely sealed against the outside environment.

There are common ways of sterilizing the actual perishable product known to the art. Regarding the packaging components, all surfaces that come into eventual contact with the perishable product must be sterilized. In the case of many commonly used plastic packaging components, such as containers and closures, high temperature sterilization is not an option, since the temperatures required may cause unacceptable distortion and weakening of the plastic material. However, alternatives exist. One common method is to thoroughly wash the plastic surfaces involved with a disinfectant sterilizing solution. A requirement of such a process is that the plastic component have no surface regions that are difficult to thoroughly contact with the disinfectant solution. This requirement sometimes restricts the ability of the packaging component designer to thoroughly exploit design principles which otherwise might be appropriate for a non-aseptic package component.

An alternative approach is to irradiate the packaging component. This approach allows more intricate or complicated packaging designs. Often the irradiation is performed to bulk packaged components. The various components of the package are then assembled, filled and sealed prior to leaving the sterile, clean room environment.

One problem with the irradiation approach is that the size of the irradiation chambers is limited. The chamber size limitation combined with a required residence time of exposure can impact and limit the practical size of the packaging component being irradiated. If the size exceeds this practical limit, the rate of component irradiation can slow packaging line speeds to unacceptable levels. In addition, since the irradiation chambers are often manually loaded with the bulk packaging components, there are practical and government mandated limits to the weight of the bulk package of packaging components that can be irradiated simultaneously. Larger, heavier components can make it difficult or impractical to use the irradiation approach to sterilization.

Thus, it is highly advantageous in the practice of aseptic packaging to attempt to minimize both the complexity and size of the packaging components actually required within the clean room environment. Of course, the container itself would normally be required to the sterilized and present within the clean filling room. However, alternatives may exist regarding the primary closure and sealing system. One common choice is to accomplish the primary package seal within the clean room environment using induction or conduction sealing of the filled container with a foil comprised of a laminate including a layer of aluminum metal. Another option may be to substitute a film of plastic laminate film material comprising a barrier layer, in which case a conduction heating could be used to effect a seal to the container opening. Such "innerseal" methods have been widely practiced and are well known in the art. In these cases sterilization of the foil or laminate is relatively straightforward since these materials are light and flat by nature. The sterile package with its primary foil or film seal can be subsequently removed from the clean room and the package completed with the application of an overcap. The overcap normally does not function as the primary aseptic seal (the function of the foil or film) but can serve the valuable function of supplying dispensing convenience and reclosure to the eventual consumer.

One problem with the foil or film "innerseals" is that the overcap or secondary closure often must be removed upon initial opening to remove the foil or film in order to utilize the contents. Numerous marketing studies have shown that the consumer, while recognizing the many values of the extended life aseptic packaging, finds the requirement for foil or film removal objectionable. Often a knife or other tool is required to effectively remove the foil, and the operation can be messy.

It has been found that consumers are highly comfortable and satisfied with packages whose initial opening consists of removing a "tear-out" membrane attached to a pull ring. Pulling on the pull ring removes a membrane sealing the pouring orifice of the package. Such a membrane feature appears on many carton type containers of products such as orange juice. The tear out membranes are somewhat resin specific in that they are normally made from low density polyethylene (LDPE). LDPE is unique in that it allows facile linear tearing along a thinned score line, as is known in the industry. Examples of the use of tear out membranes for sealing plastic bottle finishes are shown and taught in U.S. Ser. No. 10/854,925, commonly owned by the assignee of the instant invention. The embodiments of that application show application of a membrane "fitment" as the primary seal mechanism for the neck of a bottle. The exterior surface of the fitments shown there have structure to mate with structure on an additional reclosure cap intended to reseal the package after the initial opening by membrane tear out.

One may propose using the tear out membrane concept with aseptic packaging. However, the current inventors are not aware of such membranes being used on aseptic packaging. The membrane structures are often somewhat complicated in design, having structural features which may be difficult to reach or effectively contact with sterilizing solution. To be suitable for aseptic application using sterilizing solution, these inhibiting structural features must be eliminated.

Alternatively, the tear out "fitment" may be sterilized using irradiation. In this case the bulk volume and mass of the fitments must be minimized, for the reasons discussed above.

Finally, when using or contemplating a tear out membrane "fitment" for an aseptic package, the primary seal of the "fitment" to the container neck is important. Even minute ingress or egress of materials from the exterior environment can negatively impact the package performance. Thus, it may be advantageous to employ a threaded attachment of the tear out membrane "fitment" to the container neck. Threaded attachment supplies the mechanical advantage which may be required to promote adequate performance of sealing between the "fitment" and container neck.

What is needed is a new and improved tamper-evidencing closure system which overcomes the above and other disadvantages of known closure systems.

The present invention provides for various embodiments one of which may teach improvements in the design and manufacture of packaging components employing pull out membranes to achieve initial sealing and provide facile initial opening.

Another embodiment may teach improved and novel designs and manufacturing methods for producing initially joined packaging components which cannot be reassembled following separation during initial package opening.

A further embodiment may advance improved component designs suitable for the aseptic packaging of perishable products.

Yet an additional embodiment may allow aseptic packaging processing incorporating improved packaging components which can be sterilized in a practical manner by either irradiation or wet sterilization techniques.

Other embodiment and their advantages should become clear in light of the following Figures and Description of preferred embodiments.

BRIEF SUMMARY OF THE INVENTION

In summary, one aspect of the present invention is directed to a method of joining separable components including: providing a first component having first interlocking structure; and molding a second component in a plastics injection molding process within a mold utilizing a surface of the first interlocking structure of the first component as a portion of the mold, the second component being formed with second interlocking structure complementary to the first interlocking structure which mechanically interlocks the first component and the second component, the mechanical interlock being releasable without fracture of at least one of the first and second interlocking structures.

In one embodiment, the molding step further forms the mechanical interlock to be releasable without fracture of the first and second interlocking structures. The molding step may form the first and second interlocking structures such that the interlocking structures cannot be reassembled after the mechanical interlock has been released. In one embodiment, the providing step is accomplished by providing the first interlocking structure with a recess having first trapezoidal cross-section and the forming step is accomplished by forming the second interlocking structure with a protrusion having a second trapezoidal cross-section complementary to the first trapezoidal cross-section.

Another aspect of the present invention is directed to a closure for a container including a first component having a first interlocking structure and a second, plastics injection molded component having a second interlocking structure molded in situ against the first interlocking structure. The second interlocking structure is complementary in shape to the first interlocking structure and is in mechanical interlocking engagement with the first interlocking structure. The mechanical interlocking engagement is releasable without fracture of at least one of the first and second interlocking structures.

In one embodiment, the mechanical interlocking engagement is releasable without fracture of the first and second interlocking structures. Preferably, the first and second interlocking structures cannot be reassembled after the mechanical interlocking engagement has been released.

Yet another aspect of the present invention is directed to a tamper-evidencing closure for a container having a container opening in which the closure includes a closure base having a dispensing aperture adapted for mounting on the container adjacent the container opening, a sealing member for closing the dispensing aperture and the container opening, and a connection member releasably interconnecting the closure base and the sealing member. One of the closure base and the sealing member is formed of a first material and the connection member is formed of a second material, the second material being more pliable than the first material.

In one embodiment, the closure base further includes an annular top, a well defined by an inner skirt depending downwardly from an inner perimeter of the annular top, and an annular bottom extending radially inward from the inner skirt, the bottom having a closure aperture for accessing the container opening, and the first interlocking structure including a recess located on the annular bottom. The recess is complimentary to a projection on a connection member. The recess may be, for example, a trapezoidally-shaped recess. The closure base may include a retainer for securing the closure base to the container. The closure base may include an outer skirt depending downwardly from an outer periphery of the annular top, the retainer including a retaining band extending inwardly and upwardly from a lower portion of the outer skirt.

In one embodiment, the sealing member includes a pull-ring. One of the sealing member and the connection member may include a sealing peripheral lip and the other one of the sealing member and the connection member may include a continuous ring having an engagement groove cooperating with the sealing peripheral lip to mechanically interlock the connection member and the sealing member.

Either the closure base and/or the connection member may include a recess and the other of the closure base and/or the connection member may include a protrusion complementary in shape to the recess. The protrusion and/or the recess may have trapezoidally-shaped cross-sectional profiles.

The closure base may be formed of polypropylene, high-density polyethylene, and/or low-density polyethylene. The sealing member may be formed of polypropylene, high-density polyethylene, and/or low-density polyethylene. The connection member may be formed of low-density polyethylene and/or thermoplastic elastomer.

In one embodiment, the closure may be dimensioned and configured for use with a container having a container opening, a neck finish, and a locking surface on the neck finish. The closure may further include a plurality of retaining flaps extending radially inwardly and upwardly from a lower portion of an outer skirt of the closure base, each the retaining flap including an oblique wing having a arcuate inner edge adapted to engage a corresponding surface, such as a locking surface, on the container, wherein each wing includes a concave lower surface dimensioned and configured to closely approximate the outer diameter of the neck finish below the locking surface allowing substantially the entire inner edge to contact the corresponding surface. The locking surface on the neck finish may include a plurality of teeth, and the closure may further include one or more vertically extending or projecting members, such as gusset(s), extending along at least one of the flaps and being dimensioned and configured to abut against the teeth or corresponding structure of the neck finish. The closure may further include a plurality of biasing ribs extending radially inward from an inner surface of the outer skirt toward a respective one of the flaps to bias the inner edges into contact with the locking surface of the container.

In one embodiment, the closure may further include a plurality of lines of weakness extending upwardly along a lower portion of an outer skirt of the closure base, the lines of weakness being dimensioned and configured to split upon at least partial removal of the closure from the container. The lines of weakness may extend substantially vertically along the lower portion of the outer skirt.

Another aspect of the present invention is directed to a tamper-evidencing closure for a container having a container opening, a neck finish, and a locking surface on the neck finish. The closure includes a closure base having a top and an annular outer skirt depending from a periphery of the top, a plurality of retaining flaps extending radially inwardly and upwardly from a lower portion of the outer skirt, each the retaining flap including an oblique wing having a arcuate inner edge adapted to engage the locking surface of the container, wherein each wing includes a concave lower surface dimensioned and configured to closely approximate the outer diameter of the neck finish below the locking surface allowing a majority of the inner edge to contact the locking surface.

The neck finish may include one or more teeth and the closure may further include a vertically extending or projecting member, such as a gusset, extending along at least one of the flaps and being dimensioned and configured to abut against the teeth or corresponding structure of the neck finish. The closure may further include a plurality of biasing ribs extending radially inward from an inner surface of the outer skirt toward a respective one of the flaps to bias the inner edges into contact with the locking surface of the container when the closure is mounted on the container. The closure may further include a plurality of circumferentially spaced lines of weakness extending substantially vertically along the lower portion of the outer skirt, the lines of weakness being dimensioned and configured to split upon partial removal of the closure from the container.

Yet another aspect of the present invention is directed to a tamper-evidencing closure for a container having a container opening, a neck finish, and a locking surface on the neck finish. The closure includes a closure base having a top and an annular outer skirt depending from a periphery of the top, a retainer extending radially inwardly and upwardly from a lower portion of the outer skirt, and a plurality of circumferentially spaced lines of weakness extending upwardly along the lower portion of the outer skirt, the lines of weakness being dimensioned and configured to split upon partial removal of the closure from the container.

In one embodiment, the plurality of lines of weakness extend substantially vertically along the lower portion of the outer skirt. The plurality of lines of weakness may extend substantially parallel to one another. The plurality of lines of weakness may extend from a bottom edge of the lower portion of the outer skirt.

Still another aspect of the present invention is directed to a tamper-evidencing closure for a container having a container opening, a neck finish, and a locking surface on the neck finish. The closure has a top, a skirt depending from the top, and a removable sealing membrane attached to a lower portion of the skirt. The skirt and membrane structure is devoid of structure which could shade internal surfaces from exposure to an aseptic cleaner solution. The closure may include additional structure complimentary to external mating structure on the container neck to ensure secure retention of the closure to the container neck. The closure may further include structure to accommodate releasable engagement of a reclosure cap.

The tamper-evidencing closure system of the present invention has other features and advantages which will be apparent from or are set forth in more detail in the accompanying drawings, which are incorporated in and form a part of this specification, and the following Detailed Description of the Invention, which together serve to explain the principles of the present invention.

BRIEF DESCRIPTION OF THE DRAWINGS

FIG. 1 is a perspective view of a tamper-evidencing closure system in accordance with the present invention.

FIG. 2 is a top plan view of the closure system of FIG. 1.

FIG. 3 is a side elevational view of the closure system of FIG. 1.

FIG. 4 is a cross-sectional view of the closure system of FIG. 1 taken substantially along line 4-4 of FIG. 2.

FIG. 5 is a cross-sectional view of the closure system of FIG. 1 taken substantially along the line 5-5 of FIG. 2.

FIG. 6 is a cross-sectional view of the closure system of FIG. 1 taken substantially along the line 6-6 of FIG. 2.

FIG. 7 is a perspective view of another tamper-evidencing closure system in accordance with the present invention.

FIG. 8 is a bottom perspective view of the closure system of FIG. 7.

FIG. 9 is a top plane view of the closure system of FIG. 7 showing a closure base having a reclosure cap mounted thereon.

FIG. 10 is a cross-sectional view of the closure system of FIG. 7 taken substantially along the line 10-10 of FIG. 9.

FIG. 11 is an enlarged detail of FIG. 10.

FIG. 12 is a cross-sectional view of the closure system of FIG. 7 taken substantially along the line 11-11 of FIG. 9.

FIG. 13 is an enlarged detail of FIG. 12.

FIG. 14 is a perspective view, similar to FIG. 7, of another tamper-evidencing closure system in accordance with the present invention.

FIG. 15 is a bottom perspective view of the closure system of FIG. 14.

FIG. 16 is a cross-sectional view, similar to FIG. 4, of another tamper-evidencing closure system in accordance with the present invention.

FIG. 17 is an upper perspective view of another tamper-evidencing closure system in accordance with the present invention.

FIG. 18 is a lower perspective view of the closure system of FIG. 17.

FIG. 19 is a cross-sectional view of the closure system of FIG. 17.

FIG. 20 is an upper perspective view of a neck finish of a container that may by used in combination with one or more of the above closure systems.

FIG. 21 is a side elevational view of the neck finish of FIG. 20.

FIG. 22 is a cross-sectional, fragmentary plan view of the neck finish of FIG. 20, taken substantially along line 22-22 of FIG. 21.

FIG. 23 is a cross-sectional, fragmentary side elevational view of the neck finish of FIG. 20, taken substantially along line 23-23 of FIG. 22.

FIG. 26 is an upper perspective view of another closure system in accordance with the present invention.

FIG. 27 is an upper perspective view of a connection member of the closure system of FIG. 26.

FIG. 29 is an enlarged cross-sectional view of the closure system of FIG. 26 taken along line 29-29 of FIG. 28.

FIG. 30 is an enlarged cross-sectional view of the closure system of FIG. 26 taken along line 30-30 of FIG. 28.

FIG. 31 is an upper perspective view of another closure system in accordance with the present invention.

FIG. 32 is a lower perspective view of the closure system of FIG. 31.

FIG. 33 is a fragmentary cross-sectional view of the closure system of FIG. 31 taken substantially along line 33-33 in FIG. 31.

FIG. 34 is an exploded cross-sectional view of a closure system similar to that shown in FIG. 26 in combination with a container and a cap in accordance with the present invention.

FIG. 38b is a lower perspective view of the embodiment of FIG. 38a;

FIG. 38c is a side view of the embodiment of FIG. 38a along with a container neck having corresponding structure to cooperatively engage the projecting members on the closure base.

FIG. 41 is a fragmentary sectional view of tiered projecting members formed of a plurality of anti-rotation contact ridges wherein a first larger dominant lug protects subsequent smaller subservient ridges from damage.

FIG. 42 is a top plan of a closure having an off-set pull-ring fostering a user's finger access to grip and pull the pull-ring to remove a sealing member from the closure base.

FIG. 43a is a lower perspective view of a closure having one or more projecting members on flexible wings and including knurls on the top portion of the closure and having a tapered lower portion.

FIG. 43b is a side view of the embodiment of FIG. 43a along with a container neck having corresponding structure to cooperatively engage the projecting members on the closure base.

FIG. 45a is a lower perspective view of a closure having projecting members on flexible wings and including flanges on the outside surface of the outer skirt.

FIG. 45b is a side view of the embodiment of FIG. 45a along with a container neck having corresponding structure to cooperatively engage the projecting members on the closure base.

DETAILED DESCRIPTION OF THE INVENTION

Figure 24:
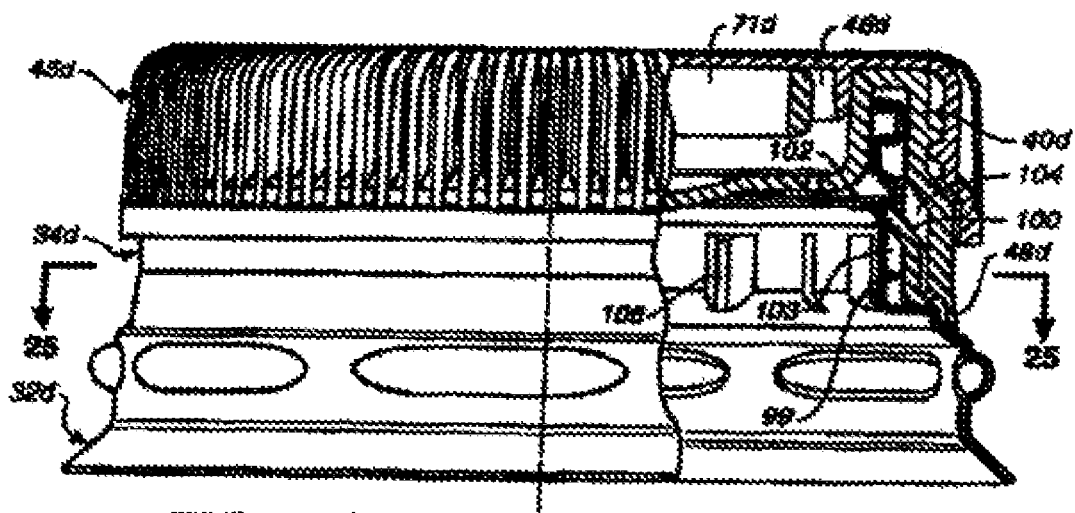
FIG. 24 is a partial cross-sectional, side elevational view of the closure system of FIG. 17 applied to the neck finish of FIG. 20.
Figure 25:
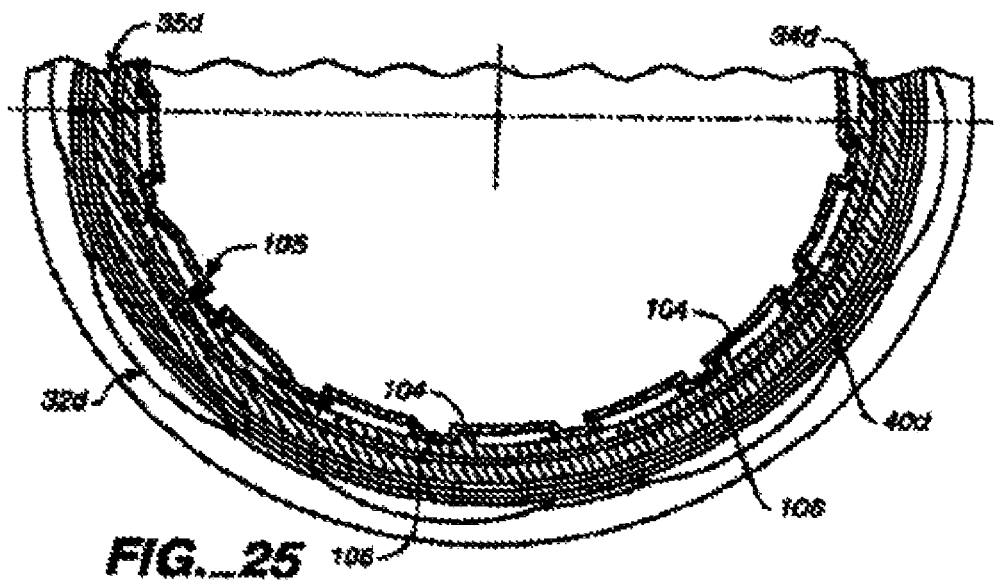
FIG. 25 is a cross-sectional, fragmentary plan view of the closure system of FIG. 17 applied to the neck finish of FIG. 20, taken substantially along line 25-25 of FIG. 24.
Figure 28:
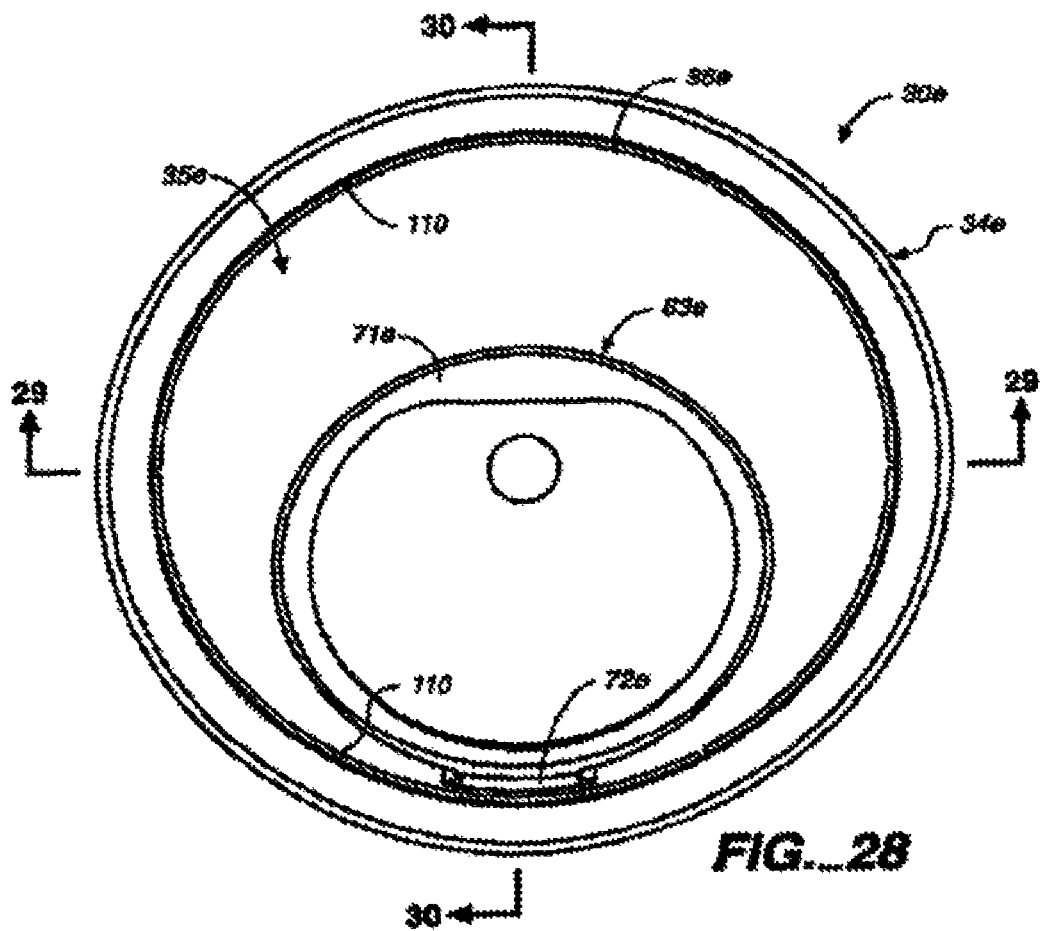
FIG. 28 is a top plan view of the closure system of FIG. 26.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Turning now to the drawings, wherein like components are designated by like reference numerals throughout the various figures, attention is directed to FIGS. 1-6 which illustrate a tamper-evidencing closure system, generally designated 30, which is adapted to be secured to a container (e.g., container 31a shown in FIG. 10).

a. As shown in FIG. 1, closure system 30 includes a closure base 34 that is adapted for mounting on the container, a sealing member 35 for sealing the opening and thus the contents of the container, and a connection member 36 for releasably connecting the sealing member 35 to the closure base 34.

b. The closure base is generally dimensioned and configured to be secured to a container adjacent the opening thereof. In the embodiment illustrated in FIGS. 1-6, closure base 34 is configured to mate with a container of the type having a non-threaded neck finish of the snap-on variety (see, e.g., FIG. 23). One should appreciate, however, that the closure base of the present invention is equally suited for use with other types of containers including, but not limited to, containers having threaded neck finishes as well as paperboard containers.

c. With reference to FIG. 4, closure base 34 includes an annular top 39 and an outer skirt 40 depending downwardly from an outer periphery of annular top 39. An upper portion of outer skirt includes external cap-engaging threads 43 configured and dimensioned to releasably engage internal threads (e.g., cap threads 44a as shown in FIG. 10) of a reclosure cap (e.g., cap 45 shown in FIG. 10). One should appreciate that other means can be utilized to releasably secure the reclosure cap to the closure base in accordance with the present invention. Alternatively, one should appreciate that the tamper-evidencing closure system of the present invention need not incorporate a removable cap. For example, a resealable or reclosure cap would not be necessary if the closure system of the present invention is to be used with a school milk container or other type of single serving container.

d. With reference to FIG. 4, a lower portion 48 of skirt 40 includes retaining structure or a retainer 49 which securely engages closure base 34 on the container. In one embodiment, retainer 49 includes a retaining band 50 that extends radially inwardly and upwardly from lower portion 48 of skirt 40 and is configured to mate with the finish of the container. In the illustrated embodiment, lower portion 48 and retaining band 50 form a J-shaped structure that is dimensioned and configured to cooperate with a locking surface (e.g., locking surface 52a shown in FIG. 10) on the container in a manner similar to that disclosed by U.S. Pat. No. 5,913,437 to Ma, the entire content of which is incorporated herein by this reference. Unlike the structure disclosed by the '437 patent, however, the retaining band 50 is configured to provide the primary engagement between closure base 34 and the container. The J-shaped configuration facilitates application of closure base 34 to a container neck in that such configuration requires lower axial application force than other conventional closures. Advantageously, this configuration also allows greater interference between the closure plug seal and the container, which in turn provides better sealing performance.

e. With continued reference to FIG. 4, retaining band 50 includes a plurality of projecting members 51, such as gussets, which are configured and dimensioned to cooperate with corresponding structure on the container neck in order to restrict rotational movement of closure base 34 with respect to container neck. In this manner, the configuration of gussets 51 facilitates threading and unthreading the reclosure cap on closure base 34 because the gussets limit rotational movement between the closure base and the container.

f. As illustrated in FIGS. 3 and 4, retainer 49 includes a plurality of vertical lines of weakness 53 aligned with a corresponding number of drainage holes 54 located in retainer 49 adjacent the intersection of retaining band 50 and lower portion 48 of the outer skirt. The configuration of the drainage holes 54 and vertical lines of weakness 53 provides an additional tamper-evidencing feature that facilitates damage to or destruction of closure base 34 in the event that someone attempts to remove it from the container once the closure base has been applied to the container. In particular, should someone attempt to pry closure base 34 from the container neck, lower portion 48 of the outer skirt will split along one or more vertical lines 53 thus providing visible evidence that the contents of the container may have been accessed and/or tampered with. One should appreciate that the closure base need not be provided with such vertical lines of weakness and/or drainage holes 54. In the event that the closure base includes both vertical lines of weakness and drainage holes, one should appreciate that the vertical lines need not be aligned with the drainage holes in the retaining band to provide tamper-evidencing.

Turning to FIG. 4, closure base 34 also includes an inner skirt 56 depending from an inner edge of annular top 39 and cooperates by way of an interference fit with the inside bore of the container neck (e.g., container neck 57a shown in FIG. 11) to define a plug seal which serves as the primary seal between the tamper-evidencing closure and the container. An annular bottom 58 extends radially inward from the bottom of inner skirt 56. Inner edge 61 of bottom 58 defines an aperture that is initially closed or sealed by sealing member 35 and connection member 36. As discussed in greater detail below, a consumer may remove the sealing member and the connection member in order to gain access to the contents of the container.

The plug seal configuration of the present invention provides improved sealing performance as inner skirt 56 is supported at the top and bottom thereof. In particular, the structural integrity of the top of inner skirt 56 is reinforced by annular top 39 while the structural integrity of the bottom is reinforced by annular bottom 58.

Although the amount of application force required to apply the plug seal configuration of the present invention may be greater than a standard hollow plug, such increased application force is possible because the retainer configuration of the present invention requires a lesser amount of application force. Keeping the overall application force necessary to apply a closure to a container constant, more force can be applied to the plug seal configuration of closure system 30 because the configuration of retainer 49 requires less force, as is noted above.

Although the sealing member and connection member of the illustrated embodiment are set within a well, one should appreciate that the closure base of the present invention need not be provided with a well. For example, the connection member may directly interconnect the sealing member to the annular top in accordance with the present invention. In this example, the primary seal may be located between the annular top and the container neck. Alternatively, one should also appreciate that connection member may directly interconnect the sealing member and the outer skirt and/or other portion of the closure base. For the purpose of the present invention, the term "closure base" broadly refers to the component used to secure the tamper-evidencing closure system to a corresponding container.

Preferably, closure base 34 is formed of polypropylene, high-density polyethylene (HDPE), low density polyethylene (LDPE), or other suitable material which provides the closure base with suitable structural integrity. One should appreciate that other materials can be used in accordance with the present invention.

As most clearly shown in FIG. 1, closure system 30 also includes a sealing member 35 which is dimensioned and configured to substantially seal the aperture formed by inner edge 61 of the closure base and thus seal the container. Sealing member 35 generally includes a relatively thin membrane 62 and a gripping member 63. Membrane 62 has an outer diameter that is slightly less than the inner diameter of the aperture formed by inner edge 61. For the purpose of the present invention, the term "membrane" is also intended to cover any relatively thin structure that is dimensioned to substantially cover the aperture formed by inner edge 61.

Sealing member 35 also includes a sealing peripheral lip 67 extending along the outer perimeter of membrane 62, as shown in FIG. 4. Sealing peripheral lip 67 includes an engagement groove 70, which is configured to cooperate with connection member 36 as is discussed in greater detail below.

In the embodiment illustrated in FIG. 4, gripping member 63 in the form of a pull-ring 71 and is of generally conventional design. Namely, pull-ring 71 is connected to membrane 62 by post 72 and forms a generally circular loop. The loop is dimensioned to receive the finger of a consumer thus allowing the consumer to grip and pull the pull-ring in order to remove sealing member 35 from closure base 34.

Preferably, sealing member 35 is formed of polypropylene, high-density polyethylene (HDPE), low-density polyethylene (LDPE), or other suitable material that provides the sealing member with suitable structural integrity. One should appreciate that other materials can be used in accordance with the present invention. Preferably, the sealing member is monolithically formed with the closure base.

Connection member 36 interconnects the closure base 34 and sealing member 35. The connection member includes a continuous ring 74 that has an engagement groove 75 which cooperates with engagement groove 70 of sealing member 35 to provide a strong mechanical joint between the sealing member and the connection member, as shown in FIG. 4.

As shown in FIG. 2, connection member 36 also includes a plurality of radially extending protrusions 76 that extend outwardly from continuous ring 74. In the illustrated embodiment, twelve protrusions are circumferentially spaced about continuous ring 74. One should appreciate, however, the number of protrusions as well as spacing of the protrusions may vary in accordance with the present invention. Alternatively, a complementary groove and shoulder arrangement similar to that between sealing member 35 and connection member 36 may be used to interconnect connection member 36 as closure base 34. Likewise, a radially extending protrusion/recess configuration may be utilized to interconnect sealing member 35 and connection member 36.

As shown in FIG. 5, each protrusion 76 has a trapezoidal cross-section that is complementary to the shape of a corresponding recess 79 formed on annular bottom 58. In essence, protrusion 76 forms a key that is received within the keyway that is formed by recess 79 and thus provides a strong mechanical joint which prevents sealing member 35 from moving axially with respect to annular bottom 58 of closure base 34. One should appreciate that the cross-sectional profile of the protrusions and recesses may vary in accordance with present invention. For example, the protrusions may include a semicircular cross-section, a triangular cross-section, or other suitable profile to provide an intimate mechanical connection between the connection member and the closure base. Such cross-sectional configurations allow ready release of the interengaging structures but renders reassembly extremely difficult.

In some applications, connection member 36 may be formed of a tearable material such as a low-density polyethylene (LDPE) based material or a thermoplastic elastomer (TPE). One should appreciate that other suitable tearable materials can be used to achieve specific functional performance in accordance with the present invention.

Connection member 36 may be formed of a material that is more pliable, that is, supple enough to bend freely or repeatedly without breaking, and that would more readily yield than the material forming at least one of the sealing member and the closure base. For example, closures used in hot-fill applications are often formed of polypropylene, a relatively rigid material that possesses significant structural integrity. Disadvantageously, polypropylene is unsuitable for forming structures having a continuous tear line that is intended to be torn by a consumer. In accordance with the present invention, the closure base and/or the sealing member may be formed of polypropylene while the connection member may be formed of a low-density polyethylene (LDPE) or a thermoplastic elastomer. This two material configuration allows the use of a pull-ring in a hot-fill application.

Connection member 36 connects and joins membrane 62 of sealing member 35 to annular ring 58 of closure base 34 in such a way that the connection member does not integrally bond to at least one of the sealing member and the closure base, namely, the component is formed of the different material. However, it is understood that some degree of adhesive compatibility between the materials may be desirable. Such "partial adhesion" may be employed to advantage to control the amount of membrane removal force associated with initial opening. In the illustrated embodiment, connection member 36 is discrete from closure base 34 and sealing member 35. However, it is understood that connection member may be integrally molded of the same material and at the same time as either one of the closure base or the sealing member provided that a mechanical joint is formed that can be readily separated by a consumer.

In one embodiment, the tamper-evidencing closure of the present invention is manufactured utilizing multi-shot or over-molding injection molding technologies. For example, the embodiment of FIGS. 1-6 is produced by shuttle molding by molding connection member 36 in a first injected shot utilizing a first mold core and/or cavity followed by in situ molding of closure base 34 and sealing member 35 in a subsequent shot utilizing a second mold core and/or cavity. In this manner, a very precise and intimate joining of the complementary mechanical interlocking structures between connection member 36 and closure base 34, as well as between the connection member and sealing member 35, can be achieved. Such an intimate joint configuration of a closure could not be achieved or would be very difficult to accomplish by conventional closure manufacturing methods. For example, it is not commercially feasible to mold the sealing member and the closure base separately and then precisely assemble these components in a post-molding assembly operation.

The method of using the tamper-evidencing closure in accordance with the present invention can now be described. In operation and use, when a consumer is ready to access the contents of the container, the consumer will first remove the reclosure cap to access gripping member 63 of the sealing member. With the reclosure cap removed and gripping member 63 readily accessible, the consumer will insert his or her finger through pull-ring 71 and firmly grip the pull-ring. Next the consumer will pull the pull-ring, along with the remainder of sealing member 35, upwardly in such a manner that connection member 36 will disengage from either annular bottom 58 or sealing member 35. Continued pulling of pull-ring 71 will completely disengage connection member 36 from closure base 34 or sealing member 35 thus providing access to the contents of the container.

Once the sealing member 35 is removed, interlocking engagement between connection member 36 and annular bottom 58 (or sealing member 35) is broken by physical separation. Once separated, it is virtually impossible to reassemble or otherwise engage connection member 36 to closure base from which it was separated due to the design of the interengaging structures, that is, the design of protrusions 76 and recesses 79.

In another embodiment of the present invention, closure system 30a is similar to closure system 30 described above but includes a modified sealing member 35a and a modified connection member 36a as shown in FIGS. 7-13. Like reference numerals have been used to describe like components of closure system 30a and closure system 30.

In this embodiment, connection member 36a includes a center 84 and a spoke 85 interconnecting center 84 and continuous ring 74a, as most clearly seen in FIGS. 8 and 10. The spoke configuration of connection member 36a allows central positioning of a injection molding hot tip. Although only one spoke 85 is illustrated, one should appreciate that one, two, three or more spokes may be utilized to provide a path of material from the center to the continuous ring.

In the embodiment of FIGS. 7-13, recesses 79a are in the form of channels which extend outwardly along a bottom surface of annular bottom 58a and upwardly, along an outer surface of inner skirt 56a, and to an annular seal 87 that is monolithically formed with connecting member 36a. As shown in FIG. 11, the annular seal extends up and around the upper portion of container neck 57a and provides a significant sealing surface. Optionally, annular seal 87 is provided with one or more sealing beads 88 to provide improved sealing performance.

With reference to FIG. 10, membrane 62a of sealing member 35a has a dome shape. The dome configuration of the membrane allows greater sealing force under vacuum and/or hot-fill applications. For example, the vacuum created within container 31a during the application process may tend to draw membrane 62a downward. With the plug seal configuration of the present invention, such downward force and/or motion may cause the outer perimeter membrane 62a to slightly expand whereby a lower portion of inner skirt 56a will exert a force against the inside surface of container neck 57a and thus improve sealing performance.

In operation and use, closure system 30a is used in substantially the same manner as closure system 30 discussed above.

In another embodiment of the present invention, closure system 30b is similar to closure systems 30 and 30a described above but includes an integral sealing and connection member generally designated by the numeral 91, hereinafter integral member 91, as shown in FIGS. 14 and 15. Like reference numerals have been used to describe like components of closure system 30b and closure systems 30 and 30a.

In this embodiment, integral member 91 incorporates membrane 62b and gripping member 63b as well as protrusions 76b in a monolithically formed component. Preferably, integral member 91 is formed of polypropylene, high-density polyethylene (HDPE), low-density polyethylene (LDPE), or a thermoplastic elastomer (TPE). One should appreciate that other suitable materials can be used to form the integral member in accordance with the present invention.

Membrane 62b of integral member 91 substantially seals the aperture formed by inner edge 61b in a manner similar to that discussed above with reference to the embodiment shown in FIGS. 7-13. Likewise, protrusions 76b releasably and mechanically interconnect membrane 62b and closure base 34b in a manner similar to that discussed above. The monolithic configuration of integral member 91 may simplify the design and production of the closure system because the protrusions 76*b* facilitate flow of molten plastic during injection molding from the membrane 62*b* to the closure base 34*b*. However, one will appreciate that the integral member must have sufficient structural integrity that protrusions 76*b* will yield and separate from the corresponding structure of closure base 34*b* with acceptable pull force and before gripping member 63*b* fails and is torn away from membrane 62*b*.

One will also appreciate that the integral member may take other forms and configurations in accordance with the present invention. For example, an integral member may be formed by monolithically forming sealing member 35 and connection member 36 as a single component that is releasably connected to closure base 34. Alternatively, an integral member may be formed by monolithically forming connection member 36 and closure base 34 as a single component in which case sealing member 35 is releasably connected to the integral member.

In operation and use, closure system 30*b* is used in substantially the same manner as closure systems 30 and 30*a* discussed above.

In yet another embodiment, closure system 30*c* is similar to closure systems 30, 30*a* and 30*b* described above but includes a retainer 49*c* used in combination with a monolithically-formed closure base, sealing member and connecting member, hereinafter fitment member 95, as shown in FIG. 16. Like reference numerals have been used to describe like components of closure system 30*c* and closure systems 30, 30*a* and 30*b*.

In this embodiment, fitment member 95 includes a connecting member in the form of a circular line of weakness 96 that interconnects sealing member 35*c* and closure base 34*c* in a manner similar to a conventional fitment of the type disclosed by U.S. Pat. No. 6,464,096 to Adams et al, the entire content of which is incorporated herein by this reference. In the illustrated embodiment, the circular line of weakness is formed by a downward facing groove, however, one will appreciate that an upward facing groove may be utilized. Preferably, fitment member 95 is formed of low-density polyethylene (LDPE), however, one should appreciate that other suitable materials can be used to form the fitment member in accordance with the present invention.

In this embodiment, at FIG. 16 retainer 49*c* includes projecting members, such as gussets 51*c*, to cooperate with corresponding structure on the container neck. The gussets 51*c* are modified to include an upper spiked edge extending above the top edge of retaining band 50*c*. The spiked configuration of gussets 51*c* not only allows the gussets to cooperate with corresponding structure on the container neck spaced radially inward from retaining band 50*c* but also allows the gussets to cooperate with corresponding structure on the container neck that is axially spaced above retaining band 50*c*.

Fitment member 95 is applied to a container such that retainer 49*c* engages the container in a snap-on manner similar to that of retainer 49 discussed above. In operation and use, closure system 30*c* is used in substantially the same manner as closure systems 30, 30*a* and 30*b* discussed above.

In another embodiment of the present invention shown in FIGS. 17-25, closure system 30*d* is similar to those described above but includes a modified closure base 34*d*. Like reference numerals have been used to describe like components of closure system 30*d* and those of the closure systems described above.

In this embodiment, closure system 34*d* and sealing member 35*d* are monolithically formed and are interconnected by a line of weakness 96*d* in a manner similar to that discussed above. One will appreciate that one or more of the following features of closure system 30*d* may be utilized on any one of the closure systems described above.

In this embodiment, closure base 34*d* includes a retainer in the form of a plurality of retaining flaps 99 which extend radially inwardly and upwardly from a lower portion 48*d* of outer skirt 40*d* thus forming a J-shaped structure that is dimensioned and configured to cooperate with a locking surface of the container (e.g., locking surface 52*a* shown in FIG. 10 and locking surface 52*d* shown in FIG. 21). In the illustrated embodiment, the closure base includes eight retaining flaps, however, one will appreciate that the number of retaining flaps may vary.

Unlike the above described retainers or retaining means, each retaining flap 99 includes an oblique, inwardly directed wing 100 that is dimensioned to closely conform to neck finish 32*d* of container 31*d* and engage locking surface 52*d* of the container neck finish 32*d* when the closure base is mounted on the container. As the retaining flaps are relatively flexible, the retaining flaps are hinged with respect to lower portion 48*d*, whereby wings 100 initially extend substantially horizontally (see FIG. 19) and upon application to the container, the lower portion of flaps 99 extend substantially vertically (see FIG. 24).

In the illustrated embodiment, wing 100 extends obliquely with respect to the lower portion of retaining flap 99, preferably in the range of approximately 120° to 150°, and more preferably approximately 135°. Wing 100 also includes a curved inner edge 102 and a lower concave face 103. The concave face is dimensioned to closely approximate the outer diameter of the container neck finish below the locking surface (see, e.g., locking surface 52*d* in FIG. 21). The concave configuration of the face allows the majority of the inner edge to abut against the locking surface instead of tangential contact if the face were flat. Thus, the concave configuration increases the amount of contact between inner edge 102 and locking surface 52*d* when closure base 34*d* is applied to the container 31*d* as compared to prior restraining devices. Furthermore, the dogleg configuration of flap 99 (as shown in FIG. 24) ensures that an inner edge 102 of wing 100 remains positioned below locking surface 52*d*.

With reference to FIG. 19, the closure base is also provided with a plurality of circumferentially spaced biasing ribs 104 that extend radially inward from an inner surface of outer skirt 40*d*. The biasing ribs 104 are dimensioned and configured to abut against and bias retaining flaps 99 inwardly such that inner edge 102 of wing 100 remains below locking surface 52*d*. The provision of biasing ribs 104 may also minimize the amount of material necessary to form the closure base. For example, since the biasing ribs 104 abut against and thus bias wings 100 inwardly, the wall thickness of flaps 99 and wings 100 need not be sufficiently thick to provide a rigid member.

Each retaining flap 99 includes a projecting member, such as a gusset 51*d*, which is dimensioned to cooperate with corresponding structure, such as an anti-rotation structure, 105 located on neck finish 32*d* of container 31*d*. As shown in FIG. 20, anti-rotation structure 105 includes a plurality of teeth 106 circumferentially spaced about the neck finish of container 31*d* below the locking surface 52*d*. As the effective inner diameter of gussets 51*d* is less than the effective outer diameter of teeth 106, gussets 51*d* will abut against a respective tooth 106 and thus prevent rotation of closure base 34*d* with respect to the neck finish of container 31*d*.

The anti-rotation configuration not only facilitates removal of reclosure cap 45*d* from closure base 34*d* by preventing the rotation of the closure base 34*d*, the anti-rotation configuration also prevents removal of the closure base 34*d* from the container 31*d*. As one familiar with the field of closures will appreciate, removal of a snap-on closure may be facilitated by twisting or rotating the snap-on closure relative to the container while axially pulling the snap-on closure away from the container. Thus, preventing rotation of the closure base will further prevent removal of the closure base from the container.

Closure base 34d is also provided with a plurality of vertical lines of weakness similar to those described above. In this embodiment, lines of weakness 53d extend upwardly along lower skirt portion 48d. In the illustrated embodiment, the lines of weakness extend substantially vertically, however, one will appreciate that the lines of weakness may extend obliquely with respect to the bottom of lower skirt portion. Also, lines of weakness 53d are provided on an interior surface of lower skirt portion 48d that extends below retaining flaps 99, however, the lines of weakness may be provided on an external surface of the lower skirt portion. Furthermore, one will appreciate that the lines of weakness may be symmetrically or asymmetrically around the outer skirt.

In this embodiment, the wall thickness of lower skirt portion 48d is significantly thinner than outer skirt 40d, and the wall thickness of vertical lines of weakness 53d is thinner still. Thus, the force required to split lower skirt portion 48d is minimal whereby substantially any attempt to pry closure base 34d from the container neck 32d will cause lower portion 48d to split along one or more vertical lines of weakness 53d thus providing visible evidence that the contends of the container may have been accessed and/or tampered with. One will appreciate that the wall thickness of the vertical lines of weakness and the wall thickness of the lower skirt portion may vary in accordance with the present invention. One will appreciate that the number of vertical lines of weakness, and the location (e.g., internal, external, or combination thereof) may also vary.

In this embodiment, annular top 39d extends inwardly from the top of outer skirt 40d, as shown in FIG. 19, and allows for a lower-profile reclosure cap configuration. For example, the plug 46d of reclosure cap 45d may be dimensioned to provide an interference fit with inner skirt 56d. Such a configuration thus provides a primary sealing surface, once sealing member 35 is removed, between reclosure cap 45d and closure base 34d that is closer to the container aperture.

In operation and use, closure system 30d is used in substantially the same manner as the closure systems discussed above.

In another embodiment of the present invention shown in FIGS. 26-30, closure system 30e is similar in some aspects to those described above but includes a low-profile closure base that is designed for use with containers having a relatively wide-profile opening. Like reference numerals have been used to describe like components of closure system 30e and those of the closure systems described above.

Closure system 30e is dimensioned and configured such that it may be used with containers having a relatively low profile and a relatively large container opening. For example, closure system 30e may be used in combination with cosmetics containers, however, one will appreciate that closure system 30e may be used in combination with other types of containers including, but not limited to, beverage containers.

As shown in FIGS. 6 and 27, closure system 30e includes a closure base 34e that is adapted for mounting on the container, a sealing member 35e for sealing the container opening and thus the contents of the container, and a connection member 36e for releasably connecting the sealing member 35e to the closure base 34e.

With reference to FIGS. 29 and 30, closure base 34e includes an annular top 39e and an outer skirt 40e depending downwardly from an outer periphery of annular top 39e. A lower portion of skirt 40e includes retaining structure in the form of a retaining bead 109 which securely mounts closure base 34e on a container in a well known manner.

As most clearly shown in FIGS. 29 and 30, closure system 30e also includes a sealing member 35e which is dimensioned and configured to substantially seal the aperture formed by inner edge 61e of the closure base and thus seal the container. Sealing member 35e generally includes a relatively thin membrane 62e and a gripping member 63e. Membrane 62e has an outer diameter that is slightly less than the inner diameter of the aperture formed by inner edge 61e.

In the illustrated embodiment, gripping member 63e in the form of a pull-ring 71e that is connected to membrane 62e by post 72e and forms a generally circular loop. The loop is dimensioned to receive the finger of a consumer thus allowing the consumer to grip and pull the pull-ring in order to remove sealing member 35e from closure base 34e.

Connection member 36e connects and joins membrane 62e of sealing member 35e to annular ring 58e of closure base 34e in such a way that the connection member sealingly bonds but does not integrally bond to at least one of the sealing member and the closure base, namely, the component is formed of the different material.

In this embodiment, connection member 36e includes a center 84e and a plurality of spokes 85e interconnecting center 84e and a continuous ring 74e, as most clearly seen in FIG. 27. The spoke configuration of connection member 36e allows central positioning of a injection molding hot tip. Although four spokes 85e are illustrated, one should appreciate that one, two, three or more spokes may be utilized to provide a path of material from the center to the continuous ring.

Frangible bridges 110 may be provided, however, that extend between closure base 34e and sealing member 35e. The frangible bridges may serve to provide a path for material to flow during the molding process from the sealing member to the closure base (and/or vise versa) and/or to position sealing member with respect to the closure base.

Preferably, closure system 34e is manufactured utilizing multi-shot or over-molding injection molding technologies. For example, closure base 34e and sealing member 35e are formed with a first injected shot utilizing a first mold core and/or cavity followed by in situ molding of connecting member 36e in a subsequent shot utilizing a second mold core and/or cavity. In this manner, a very precise and intimate joining of the complementary mechanical interlocking structures between connection member 36e and closure base 34e, as well as between the connection member and sealing member 35e, can be achieved.

In operation and use, closure system 30e is used in substantially the same manner as those discussed above.

In another embodiment of the present invention shown in FIGS. 31-33, closure system 30f, in some aspects, is similar to those described above. Like reference numerals have been used to describe like components of closure system 30f and those of the closure systems described above.

As shown in FIG. 31, closure system 30f includes a closure base 34f that is adapted for mounting on the container, a sealing member 35f for sealing the opening and thus the contents of the container, and a connection member 36f for releasably connecting the sealing member 35f to the closure base 34f.

With reference to FIGS. 31 and 32, closure base 34f is in the form of an annular ring 113 that is applied to a container about the opening thereof. The annular ring may be adhered, heat sealed, or otherwise affixed to the container by suitable well-known means.

As most clearly shown in FIGS. 32 and 33, closure system 30f also includes a sealing member 35f which is dimensioned and configured to substantially seal the aperture formed between inner edge 61f of the closure base and the outer periphery of membrane 62f of the sealing member, and thusly seal the container. Sealing member 35f generally includes a relatively thin membrane 62f and a gripping member 63f. Membrane 62f has an outer diameter that is slightly less than the inner diameter of the aperture formed by inner edge 61f.

In the illustrated embodiment, gripping member 63f in the form of a pull tab 114 that is connected to membrane 62f adjacent the perimeter thereof. The tab is dimensioned to allow a consumer to grip and pull the pull tab in order to remove sealing member 35f from closure base 34f.

Connection member 36f connects and joins membrane 62f of sealing member 35f to annular ring 58f of closure base 34f in such a way that the connection member sealingly bonds but does not integrally bond to at least one of the sealing member and the closure base. The "non integral" connection is achieved by proper choice of materials for the various components different material such that controlled adhesion is achieved without integral bonding.

With reference to FIG. 33, connection member 36f includes a continuous ring 74f which extend circumferentially around the sealing member and fills the void between the sealing member and the closure base 34f. The connection member 36f also includes an upper flange 116 and a lower flange 117 which provide the connection member with a substantially I-shaped cross-section. The I-shaped configuration enhances the structural integrity of the mechanical joint by providing opposing channels that receive and thus engage the closure base and the sealing member, respectively.

In the illustrated embodiment, the upper and lower flanges do not extend completely around the sealing member but instead terminate on either side of the pull tab. In this embodiment, material forming the sealing member 35f and closure base is the same and an integral connection is made between the two in the region of the pull tab. This region facilitates flow during molding. One will appreciate that the flanges 116 and 117 may extend continuously 3600 around the sealing member.

Connection member 36f also includes a center 84f and a plurality of spokes 85f interconnecting center 84f and a continuous ring 74f, as most clearly seen in FIG. 32. The spoke configuration of connection member 36f allows central positioning of a injection molding hot tip in the same manner as discussed above.

Preferably, closure system 30f is manufactured utilizing multi-shot or over-molding injection molding technologies. For example, closure base 34f and sealing member 35f are formed with a first injected shot utilizing a first mold core and/or cavity followed by in situ molding of connecting member 36f in a subsequent shot utilizing a second mold core and/or cavity. In this manner, a very precise and intimate joining of the complementary mechanical interlocking structures between connection member 36f and closure base 34f, as well as between the connection member and sealing member 35f, can be achieved. To facilitate molding and positioning, frangible bridges such as those shown in FIG. 26 at 110, may be provided that extend between closure base 34f and sealing member 35f in the same manner discussed above.

In operation and use, closure system 30f is used in substantially the same manner as those discussed above.

Figure 35:
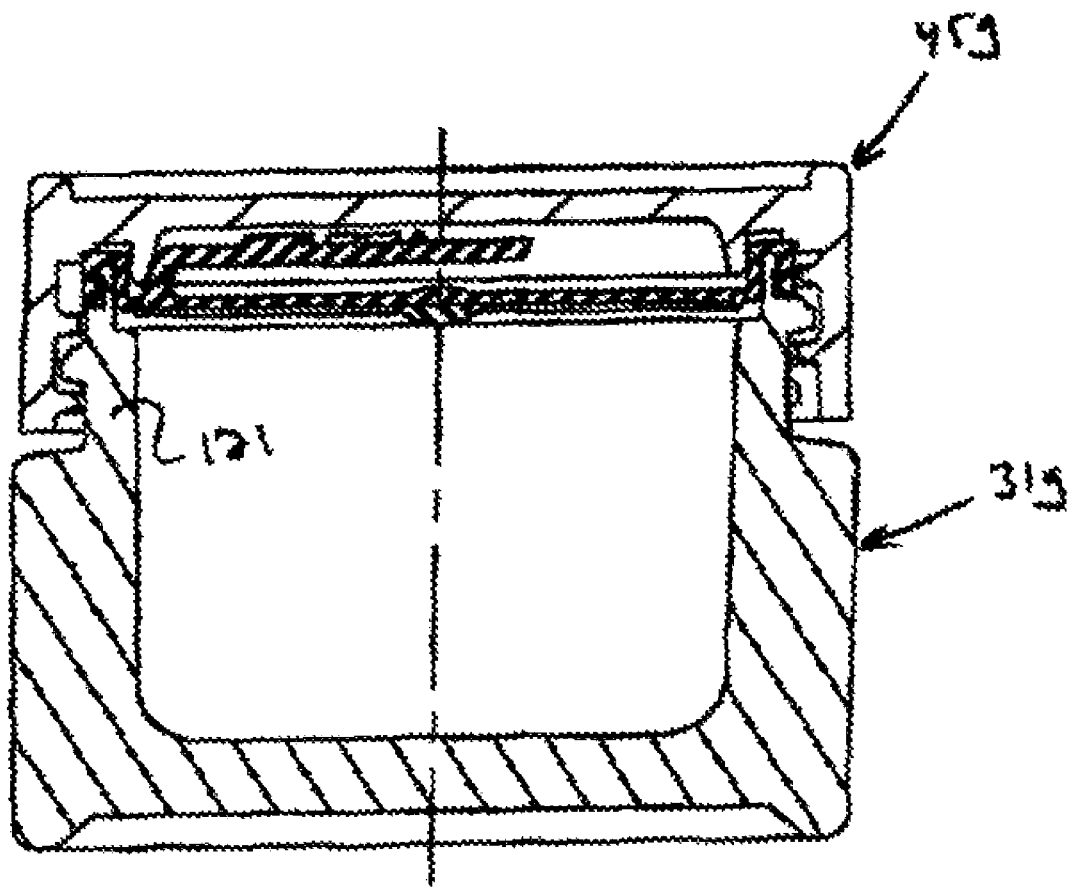
FIG. 35 is an assembled cross-sectional view of the combination of FIG. 34.

In another embodiment of the present invention, as shown in FIGS. 34 and 35, closure system 30g is similar to closure system 30e described above but includes a special container and cap configuration having a low profile and aesthetically pleasing design. Like reference numerals have been used to describe like components of 30g and 30f.

Container 31g includes a neck finish 120 having a vertical stretch 121 which has an annular top 122 as well as cap-engaging structure in the form of external threads 43g below the annular top. Unlike prior containers, container 31g further includes a reduced wall-thickness annular flange 124 extending upwardly from annular top 122 of the vertical stretch and substantially defines the container opening. As will become more apparent below, the configuration of the annular flange allows a low-profile fitment to be used in an aesthetically pleasing manner.

Closure system 30g includes a closure base 34g which has a removable sealing member 35g which defines a dispensing aperture when removed from the closure base. The closure base is mounted on container 31g in a similar manner as closure system 30e discussed above. In particular, the closure base includes an annular top 39g, an outer skirt 40g depending downwardly from an outer periphery of the annular top, and a retaining bead 109g which extends inwardly from a lower portion of the outer skirt. Retaining bead 109g and annular flange 124 are dimensioned and configured to interengage and secure closure base 34g to container 31g.

In accordance with the present invention, the wall thickness T of annular top 122 is less than the wall thickness of vertical stretch 121 thus providing clearance for the closure system with respect to the container 31g and reclosure cap 45g in several aspects. Preferably, annular flange 124 includes an annular shoulder 125 dimensioned and configured to provide locking engagement with the retaining bead.

Reclosure cap 45g has container-engaging structure in the form of internal threads 44g. Internal and external threads 44g and 43g cooperate to releasably mount the cap 45g to the container 31g in an otherwise conventional manner. One will appreciate, however, that other forms of cap-engaging and container-engaging structures may also be used, such as snap-on/snap-off configurations.

Reclosure cap 45g also includes a plug 127 that is dimensioned and configured to engage the inner skirt 56g of the closure base 34g to provide a fluid-tight seal when the cap is fully mounted on the container.

As most clearly shown in FIG. 35, an inner diameter of inner skirt 56g is greater than an inner diameter of neck finish 120 and thus prevents closure base 31g from retaining contents dispensed from the container. To provide clearance for the inner skirt, neck finish 120 includes a notch 129 that extends downwardly from an inner diameter of annular flange 124. As shown in FIG. 34, the notch preferably extends lower than an upper portion of cap-engaging structure 43g. Since the inner diameter of inner skirt 56g is greater than that of vertical stretch 121, the inner skirt will not interfere with liquid (or other dispensed contents) and nor cause contents to pool within the neck finish.

Figure 36:
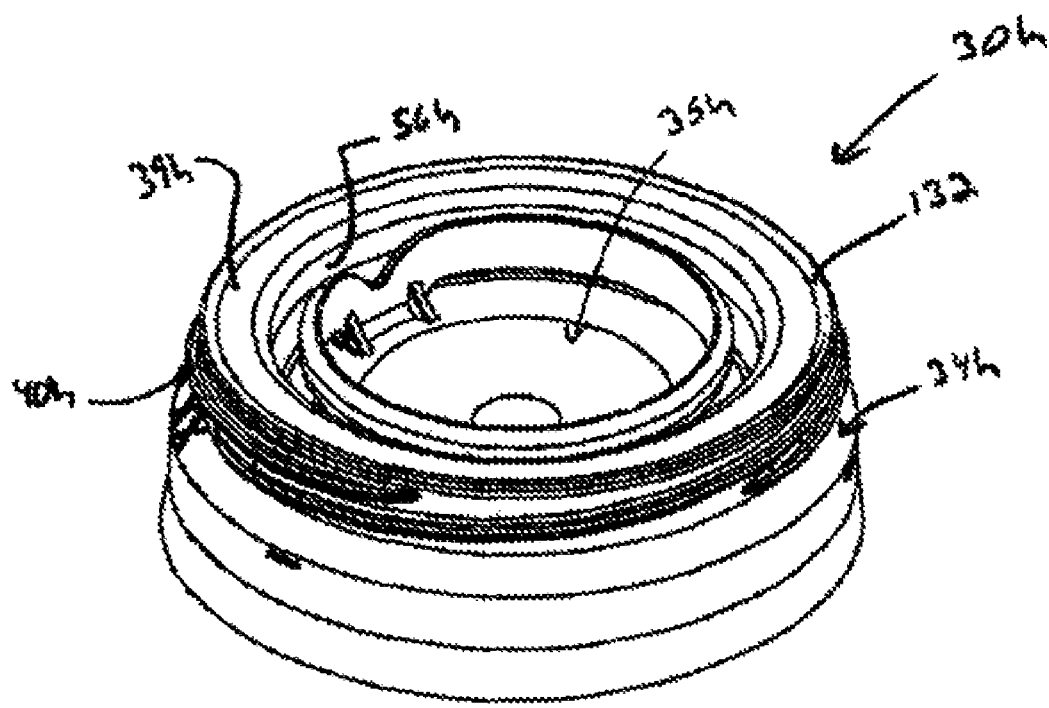
FIG. 36 is an upper perspective view of another tamper-evidencing closure system in accordance with the present invention.
Figure 37:
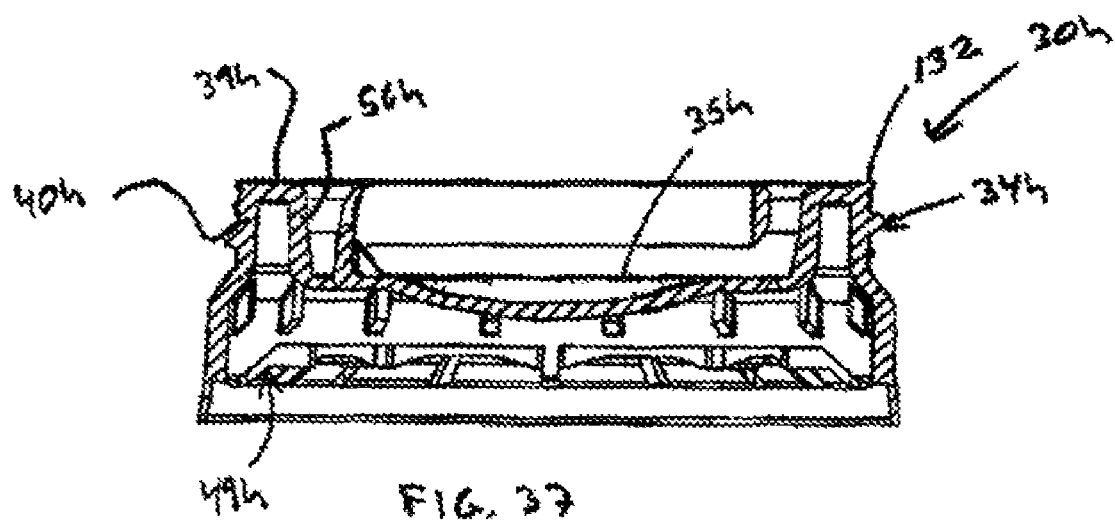
FIG. 37 is a cross-sectional view of the closure system of FIG. 36.

In another embodiment of the present invention, as shown in FIGS. 36 and 37, closure system 30h is similar to closure systems 30a-30d described above but includes a closure base 34h having a pouring lip 132. Like reference numerals have been used to describe like components of 30h and 30a-30d.

Like the closure systems described above, closure 30h includes a closure base 34h that is adapted for mounting on a container adjacent the container opening and a sealing member 35h for closing a dispensing aperture of the closure as well as the container opening. The closure base includes an annular top 39*h*, an outer skirt 40*h* depending from an outer periphery of the annular top, and an inner skirt 56*h* depending from an inner periphery of the annular top. Closure base further including a retainer 49*h* extending inwardly from a lower portion of the outer skirt and configured for non-releaseable engagement the container.

Closure 30*h*, as mentioned above, includes pouring lip 132 which extends upwardly and outwardly from the outer periphery of annular top 39*h*. The pouring lip extends above the annular top at least approximately 0.005 inches, preferably in the range of approximately 0.005 to 0.010 inches, and in one embodiment, extends approximately 0.008 inches. The pouring lip also extends outwardly from the annular top at least approximately 0.005 inches, preferably in the range of approximately 0.005 to 0.010 inches, and in one embodiment, extends approximately 0.008 inches. The pouring lip is dimensioned and configured to reduce run-off of liquids flowing from the container down the outer skirt.

Referring now back to FIG. 16, it is seen that inner skirt 56*c* extends vertically downward before merging with the generally horizontal structure of the annular bottom 58 and the sealing member 35*c*. This "well" defined by the vertical stretch of the inner skirt 56*c* is generally made deep enough to easily accommodate the height of the pull-ring 71*c* and allow sufficient space between the pull-ring 71*c* and membrane 35*c* to permit the consumer's finger to easily grasp the pull ring. In addition, the conventional "line of weakness" 96 is shown to be formed by a rectangular cutout. It has been observed that the relatively deep pocket formed by the space between the inner skirt 56*c* and the outer skirt 40*c*, plus the sharp 90 degree surface turns shown in FIG. 16, could make effective contact by a sterilizing solution difficult. In addition, the small cutout associated with the "line of weakness" 96 could be difficult to effectively clean with sterilizing solution. As a result, the structure as depicted in FIG. 16 may not be suitable for aseptic applications.

Figure 38A:
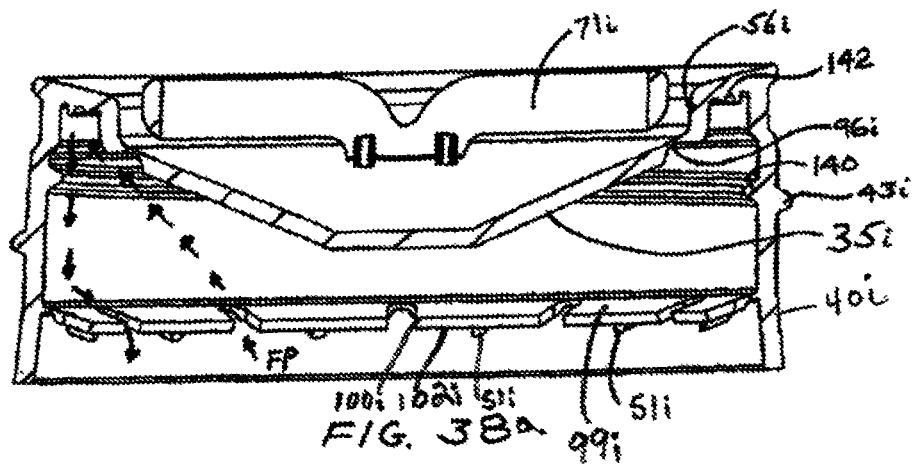
FIG. 38a is a cross-sectional view of another embodiment of the invention suitable for use in sterile extended shelf life applications which shows an improved disinfectant flow path.

FIG. 38*a* is a view similar to FIG. 16 of an alternate structure suitable for solution sterilizing. In the FIG. 38*a* embodiment, the vertical extent of the inner skirt 56*i* is minimized to only that necessary to form a sufficient seal surface for the plug of a reclosure cap. The frangible line of weakness 96*i* is formed by a "V shaped" material cutout rather than the restricted access structure of the rectangular cutout of the conventional line of weakness shown in FIG. 16. The sealing membrane 35*i* of the FIG. 38*a* embodiment is dished downward to ensure easy access to the pull ring 71*i*. In addition, this dished structure directs sterilizing solution sprayed from the bottom of the closure into a flow path designated as arrows FP which is more accessible to the pocket formed between skirt 56*i* and outer skirt 40*i*. This additional access is produced by the shortening of skirt 56*i*. Of course, the cap of FIG. 38*a* remains suitable for other sterilizing techniques, such as irradiation, while providing the improved flow path FP adapted for wet disinfectant flow.

FIG. 38*a* further shows additional structure intended to ensure adequate performance in sterile, extended life packaging. Specifically, the FIG. 38*a* embodiment shows internal thread 140 to permit threaded application to a container neck 220 having complimentary threads 222 (shown in FIG. 38*c*). In addition, the FIG. 38*a* embodiment includes dual vertically depending seal beads 142 to engage the top surface 224 of the container neck 220. Other types of seal structure known to the art could shade internal surfaces from sterilizing solution. The mechanical advantage of threaded application to a container neck ensures adequate contact pressure of the seal beads 142 to the top surface of the container neck. Further FIGS. 38*a* through 38*c* show a plurality of retaining flaps 99*i* of hinged flexibility extending radially inwardly, and optionally downwardly, from a lower portion of the outer skirt 40*i* wherein each retaining flap includes a wing 100*i* having a flat inner edge 102*i* adapted to engage the locking surface of a container neck. In similar manner and function as previously described with respect to other embodiments herein, at least one, or preferably each, retaining flap 99*i* has one or more projecting members, such as gusset(s) 51*i*, dimensioned to cooperate with corresponding structure, such as anti-rotation structure, of a neck finish. Specifically, as in FIG. 38*a*, a single gusset 51*l* extending vertically along a central portion of a lower surface of retaining flap 99*i* may be dimensioned and configured to abut against and cooperatively engage the corresponding structure of a neck finish, such as a plurality of teeth 226 circumferentially spaced about the neck finish of the container neck 220 as previously discussed herein. Alternatively, as illustrated at FIG. 41*a*, a lower surface of a retaining flap 99*j* may comprise a tiered gusset structure 190 formed of a plurality of contact ridges wherein a first leading, larger, and dominant contact ridges 192 protects at least one or more subsequent, smaller, and subservient ridges 194 from damage during contact with such neck finish teeth. In this way a dominant contact ridge 192 of a tiered gusset structure 190 undertakes greater abrasive wear from such contact in effect sacrificing itself for protection of one or more subsequent subservient contact ridges 194. Further alternatively, as illustrated at FIG. 41*b*, a lower surface of a retaining flap 99*k* may comprise a uniform flat head gusset structure 191 formed of a plurality of uniform contact ridges 193 of similar shape, size, and dimension, each of which having a flat head 195.

Figure 39:
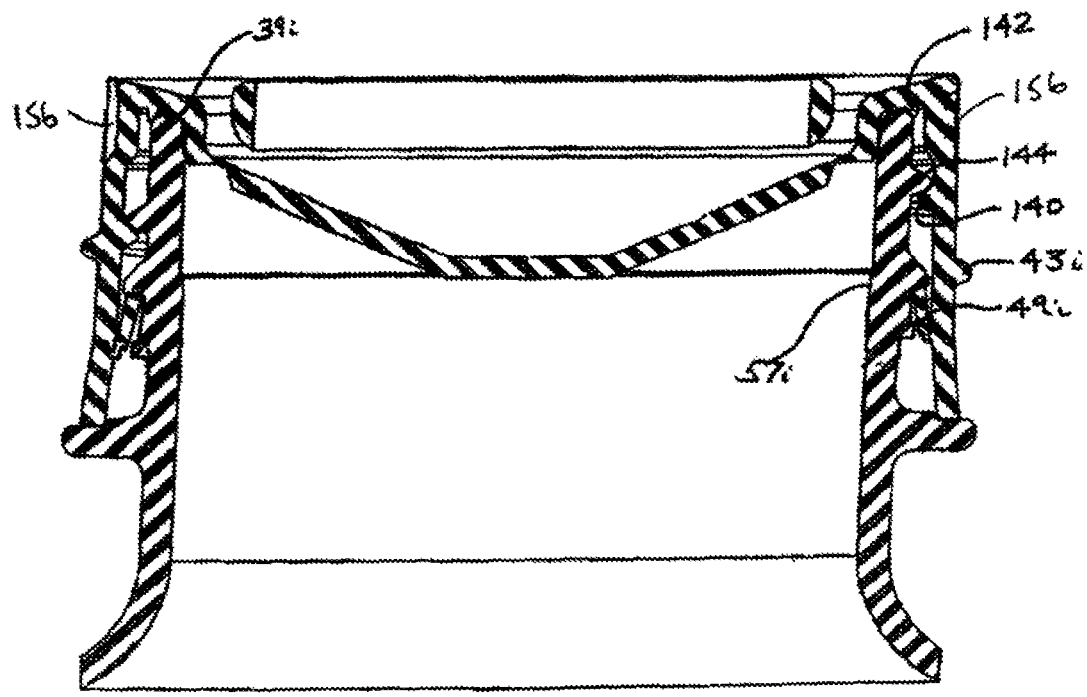
FIG. 39 is a sectional view of the FIG. 38 embodiment as applied to a container neck finish.

FIG. 39 shows a fitment closure similar to that of FIGS. 38*a* and 38*b* assembled to a container neck 57*i*. The internal thread 140 mates with external thread 144 of the container to securely retain the fitment closure to the bottle and supply adequate pressure of the seal beads 142 to the annular top 39*i* of the container neck. In the FIG. 39 embodiment of the fitment closure, knurls 156 have been included to facilitate rotational threaded application of the fitment to the container during the initial capping operation, such as with a cap chuck. One will appreciate that while threaded engagement is shown; other forms of closure/container engagements may be suitable, including snap or even adhesive attachment. Retainer 49*i* cooperates with neck finish 57*i* in essentially the same way as described for previous embodiments. Also, as with previous embodiments, a reclosure cap (not shown in FIG. 39) may be supplied to complete the assembly. While the embodiments illustrated in FIGS. 38*a* through 39 show external thread 43*i* intended to engage a reclosure cap, one will understand that other forms of retention such as complimentary snap beads could be chosen if desired.

Figure 40:
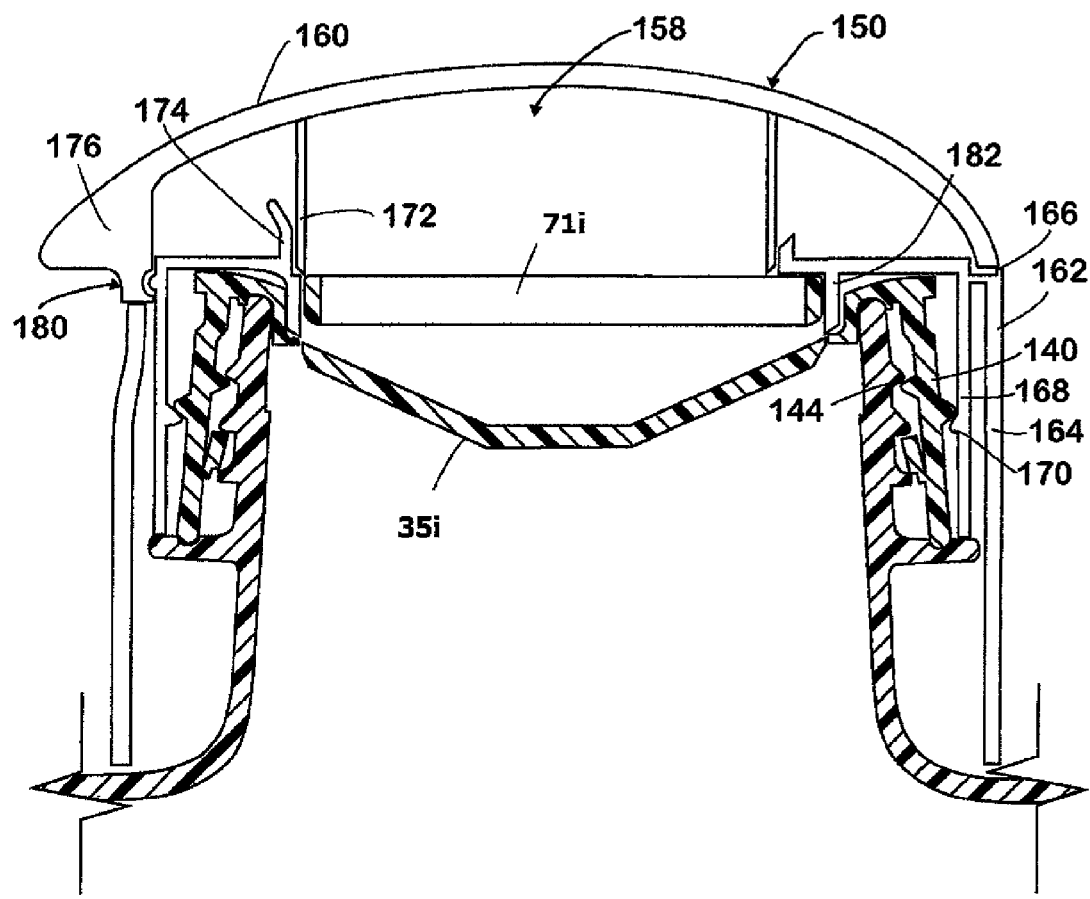
FIG. 40 is a side cut away side view showing another embodiment of the invention.

Numerous forms of reclosure cap may be chosen. For example, FIG. 40 shows a view of the aseptically suitable membrane structure described above used in conjunction with a "flip-top" dispensing overclosure 150, such as one might choose for a dairy creamer. Closure 150 has an arcuate top 160 connected to a base structure generally indicated by numeral 162. Top 160 is hingedly connected to base structure 162 by integral hinge 166. Base structure comprises an outer skirt 164 and an inner skirt 168. Inner skirt 168 includes internal threads 170 which are complimentary to external threads 43*i* on fitment outer skirt 40*i*. Depending from top 160 is hollow reclosure plug 172. Plug 172 interacts with upstanding annular ring 174 to seal the system in its closed position as shown. To open the reclosure cap, one pushes upward on tab 176 to detach the snap engagement shown at 180. The arcuate top 160 then rotates about hinge 166, thereby separating the seal between plug 172 and ring 174. Continued rotation of top 160 about hinge 166 completely exposes orifice 158 to allow access to the inner portion of the container. Reclosure cap 150 also includes a second downwardly depending hollow plug 182. The outer diameter of plug 182 is slightly larger than the inner diameter of shortened inner skirt 56i. Thus plug 182 urges skirt 56i outward to enhance the seal of skirt 56i against the inner wall of container neck 57i as shown. In the embodiment of FIG. 40, the membrane fitment is secured to the bottle using complimentary threads 144 and 140 as shown. Other structural features of the membrane fitment of FIG. 40 are similar or identical to those described in conjunction with FIGS. 38 and 39. The dispensing overclosure 150 also has an expanded orifice generally indicated by numeral 158. This allows the consumer to remove the membrane 35i on initial opening without a requirement to first remove the reclosure cap 150. Initial consumer opening can be accomplished by "flipping open" the closure top and grasping the pull ring 71i. One then pulls up on the pull ring to remove the sealing membrane 35i by actually pulling it through orifice 158. This opening mechanism is a significant advance in the art. Consumers have consistently objected to the current requirement to remove the reclosure cap in order to remove a primary foil type sealing member. Closure removal and foil removal on initial package opening can be difficult and is often messy. The instant invention allows elimination of this requirement. Indeed, the instant invention may permit permanent attachment of the reclosure cap to the container by, for example, adhesive attachment.

FIG. 42 shows that the center-point 200 of a gripping member 63k, such as pull-ring 71k joined to a membrane 62K of a sealing member 35k by post 72k, may be offset with respect to the center-point 202 of a closure cap 204 so as to more readily allow a consumer to gain finger access to the space 206 between the pull-ring 71k and connection member 36k for removal of the sealing member 35k from the closure base 34k in order to gain access to the contents of a container.

Referring now to FIG. 43a, an embodiment is illustrated similar to the embodiment of FIG. 38a. The FIG. 43a embodiment, however, includes one or more retaining flaps 99m with projecting members 230, such as contact ridges 232 (or ratchets). In the particular embodiment of FIG. 43a, one or more retaining flaps 99m include more than one contact ridge 232, and more specifically includes three contact ridges 232. Unlike the tiered contact ridges of the embodiment in FIG. 41a or the flat contact ridges of FIG. 41b, the FIG. 43a embodiment shows three similarly sized ramped contact ridges 232. Referring also to FIG. 43b, the contact ridges 232 are dimensioned to cooperate with corresponding structure 242 on a neck finish 240. The corresponding structure 242 may include anti-rotation structure such as ratchets 244 circumferentially spaced around the neck finish 240 illustrated in FIG. 43b. The fitment closure illustrated in FIG. 43a further includes knurls 234 deposed around a top section 236 of the fitment closure to facilitate rotational threaded application of the fitment closure to the neck finish. The number and placement of the knurls may be changed without affecting the function thereof. In addition, an outside surface 238 of the lower portion 239 of the outer skirt 40m is slightly tapered from where the threaded structure 43m is positioned.

Figures 44A, 44B:
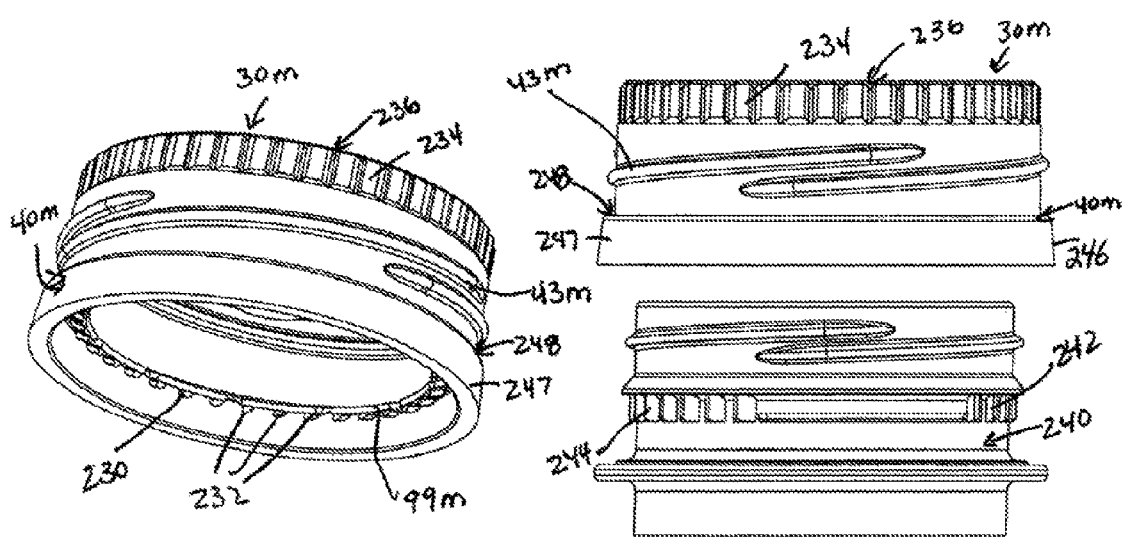
FIG. 44a is a lower perspective view of a closure having one or more projecting members on flexible wings and including knurls on the top portion of the closure and having a stepped lower portion.
FIG. 44b is a side view of the embodiment of FIG. 44a along with a container neck having corresponding structure to cooperatively engage the projecting members on the closure base.

Referring now to FIG. 44a, an embodiment is illustrated similar to, in some respects, the embodiment of FIG. 43a. The FIG. 44a embodiment, however, includes an outside surface 246 of the lower portion 247 of the outer skirt 40m that is stepped 248 from where the threaded structure 43m is positioned. An over-cap positioned over the fitment closure 30m could have the lower edge of its depending cap skirt aesthetically placed over the outer skirt 40m.

Referring now to FIGS. 45a and 45b, an embodiment is illustrated similar to the embodiment of FIG. 44a. The FIG. 45a embodiment includes flanges 250 extending outwardly from a lower portion 252 of the outer skirt 40p. The FIG. 45a embodiment includes a bottom flange 250 terminating from the outer skirt 40p and having one or more fins 251. The one or more fins 251 are positioned for engagement with corresponding engagement means on a chuck during placement of the closure fitment onto the neck finish. The engagement means on the chuck grasps the one or more fins 251 such that the closure fitment may be properly threaded or secured onto the neck finish. The one or more fins 251 would be used instead of the knurls 234. In various embodiments the fins 251 may be circumferentially spaced and/or spaced at an equal angular distance from one another, such that if four fins 251 are positioned around the flange 250, each would be 90 degrees from one another.

Figures 46A, 46B:
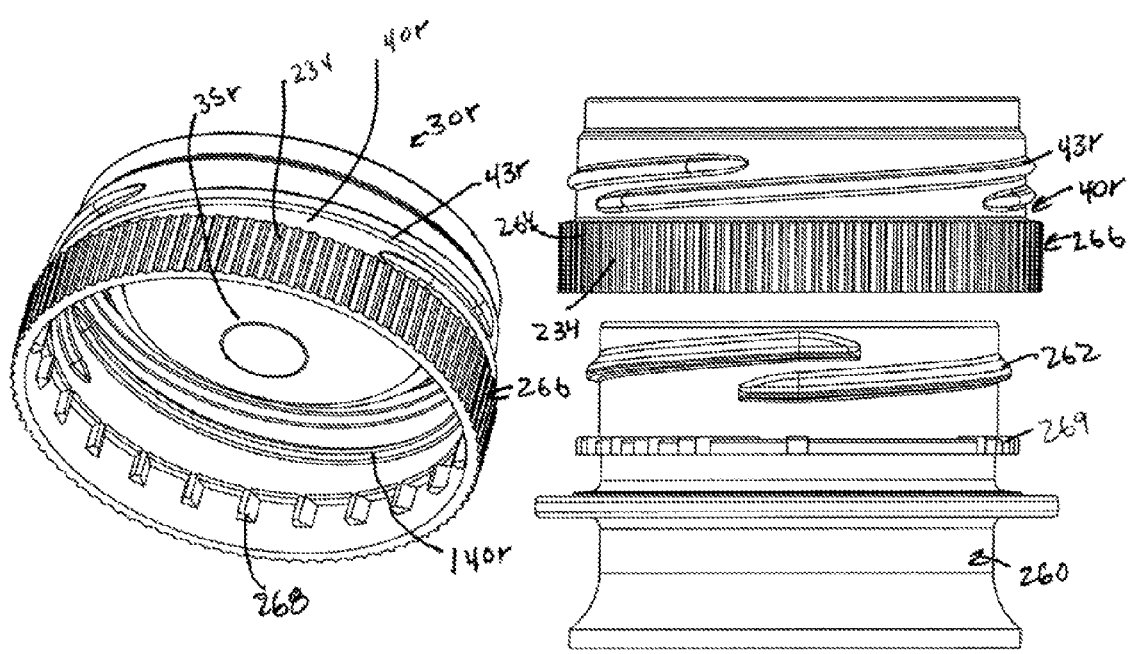
FIG. 46a is a lower perspective view of a closure having inner skirt ratchets and outer skirt knurls.
FIG. 46b is a side view of the embodiment of FIG. 46a along with a container neck having corresponding structure to cooperatively engage the inner skirt ratchets.

FIGS. 46a and 46b shows an embodiment of the closure fitment 30r having a removable membrane 35r, an internal threaded region 140r that mates with corresponding structure 262 on a neck finish 260, and an external threaded region 43r that mates with corresponding structure on a cap (not shown). The closure fitment 30r further includes knurls 234 positioned on the external surface 264 of the lower portion 266 of the outer skirt 40r. In addition, the closure fitment 30r includes one or more inner skirt ratchets 268 dimensioned to cooperate with one or more corresponding structure on the neck finish 260, such as anti-rotational ratchet structure 269 to facilitate anti-rotational movement of the closure fitment 30r when secured onto the neck finish 260.

Figures 47A, 47B:
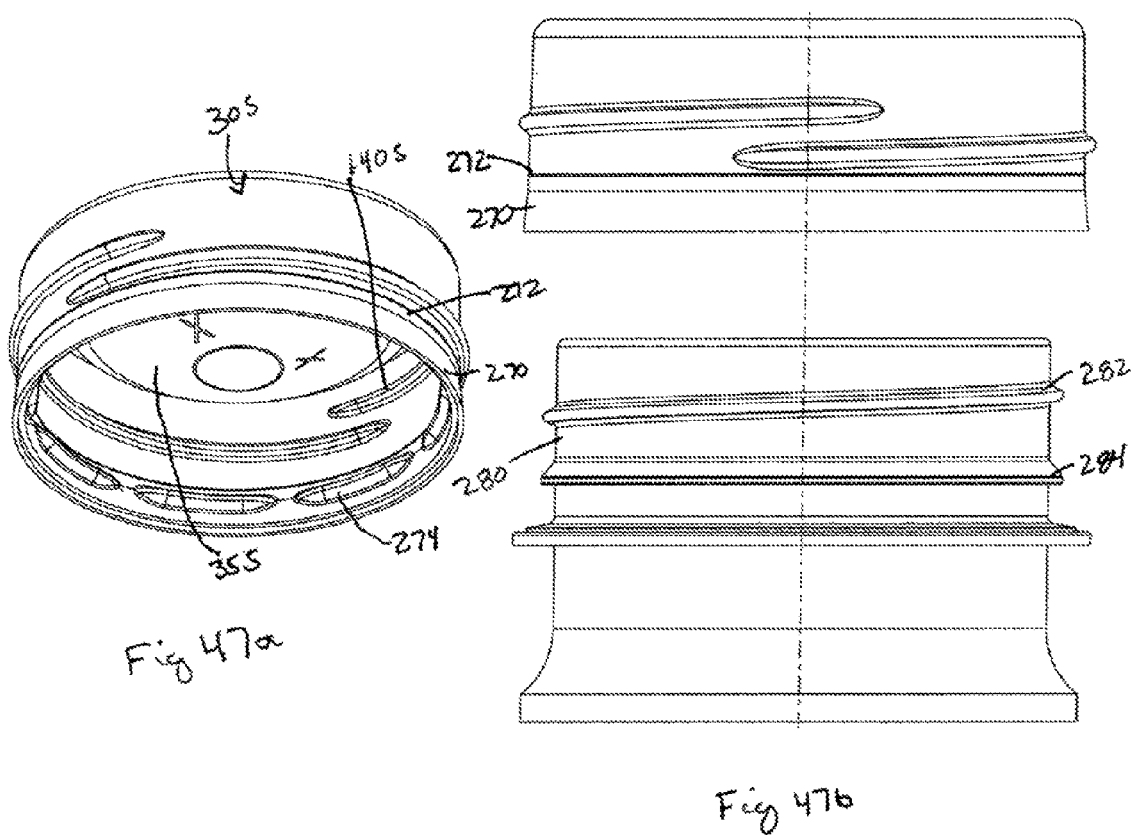
FIG. 47a is a lower perspective view of a tamper-evident closure having a circumferential frangible score-line at a lower portion of the outer skirt.
FIG. 47b is a side view of the embodiment of FIG. 47a along with a container neck having corresponding structure to cooperatively engage a retaining member of the closure.

FIGS. 47a and 47b illustrated an embodiment of a closure fitment 30s having a removable membrane 35s and an internal threaded region 140s that mates with corresponding structure 282 on a neck finish 280. The closure fitment 30s includes an outer skirt 40s with a lower section 270 that is positioned below a scored line 272. Positioned on the internal surface of the lower section 270 are one or more retaining members 274. When the closure fitment 30s is secured onto the neck finish 280, the retaining members 274 are positioned over a locking surface 284 on the neck finish 280. The locking surface 284/ retaining members 274 prevent the closure fitment 30s from being removed therefrom without damaging or tearing the scored line 272, thereby creating a tamper-evident structure. Other forms of retaining members 274 may be employed, such as a single bead or J-band configuration circumferentially positioned on the internal surface.

For convenience in explanation and accurate definition in the appended claims, the terms "up" or "upper", "down" or "lower", "inner" and "outer", "vertically" and "horizontally" and other directionally relative terms are used to describe features of the present invention with reference to the positions of such features as displayed in the figures.

In many respects the modifications of the various figures resemble those of preceding modifications and the same reference numerals followed by the subscript "a", "b", "c", "d", etc. designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An aseptic closure for a container having a container opening, the closure comprising:
    an annular top having:
        an outer skirt depending downwardly from an outer perimeter of the annular top and an inner skirt depending downwardly from an inner perimeter of the annular top, wherein a portion of the container adjacent the container opening is received between the outer and inner skirts,
        an annular bottom extending radially inward from the inner skirt, the annular bottom having defined thereon a dispensing aperture being positioned within the container opening when the closure is mounted to the container,
        a sealing member formed to the annular bottom for closing the dispensing aperture and a frangible line of weakness formed in a V-shape between the sealing member and dispensing aperture, wherein at least a portion of the sealing member is removable from the annular bottom at the frangible line of weakness to expose at least a portion of the dispensing aperture, and wherein the sealing member is secured to a gripping member, which when the gripping member is pulled the frangible line of weakness breaks separating the sealing member from the annular bottom; and
    an overclosure having:
        an annular base having an orifice positioned within the dispensing aperture, the annular base further having a first structure depending downwardly from an outer perimeter of the annular base to engage the outer skirt of the annular top, the annular base further having an annular ring extending upwardly about a perimeter defined around the orifice in a substantially parallel orientation to the container opening,
        a top hingedly connected to the base, and the top having a plug depending internally from the top and which seals against the annular ring formed by the base of the overclosure when the top is moved to a closed position and which when in the closed position the plug maintains the gripping member below the annular base, and wherein when the top is moved to an opened position at least a portion of the orifice and thus container opening being exposed whereby the sealing member can be removed through the orifice by pulling the gripping member.

2. The closure of claim 1, wherein overclosure further includes a second plug depending downwardly from the base about the orifice and positioned to engage and seal against a lateral extending portion of the inner skirt of the annular top, the second plug being oriented substantially parallel to the annular ring and having a diameter larger than a diameter of the annular ring.

3. The closure of claim 2, wherein the plug or the second plug includes surface area defining a hollow.

4. An aseptic closure for a container having a container opening extending about a first longitudinal axis, the closure comprising:
    an annular top having:
        inner and outer skirts depending downwardly from inner and outer perimeters of the annular top respectively, and the inner and outer skirts are positioned to capture a portion of the container adjacent the container opening,
        an annular bottom extending radially inward from the inner skirt, the annular bottom having a dispensing aperture positioned adjacent the container opening, and
        a removable sealing member secured to the annular bottom about the dispensing aperture by a frangible line of weakness, and wherein the removable sealing member is secured to a gripping member, which when the gripping member is pulled the frangible line of weakness breaks separating the removable sealing member from the annular bottom; and
    an overclosure having:
        an annular base having downwardly depending inner and outer structures to engage the inner and outer skirts of the annular top, respectively, the downwardly depending inner structure further defining an orifice positioned within the dispensing aperture above the removable sealing member,
        an annular ring extending upwardly from the annular base about the orifice,
        a top hingedly connected to a portion of the annular base, the top further having a first plug depending downwardly therefrom, the first plug having a diameter sized to seal against the annular ring of the overclosure when the top is moved to a closed position, and wherein when the top is moved to an opened position at least a portion of the orifice and thus container opening being exposed whereby the sealing member can be removed through the orifice by pulling the gripping member, and
        wherein the inner structure of the annular base is positioned to seal against the inner skirt of the annular top, the inner structure having a diameter larger than a diameter of the annular ring.

* * * * *